US011930293B2

(12) United States Patent
Nguyen et al.

(10) Patent No.: US 11,930,293 B2
(45) Date of Patent: *Mar. 12, 2024

(54) SYSTEMS AND METHODS FOR REDACTION OF SCREENS

(71) Applicant: Axon Enterprise, Inc., Scottsdale, AZ (US)

(72) Inventors: Anh Tuan Nguyen, Ho Chi Minh (VN); Noah Spitzer-Williams, Seattle, WA (US); Jacob Hershfield, Seattle, WA (US)

(73) Assignee: Axon Enterprise, Inc., Scottsdale, AZ (US)

(*) Notice: Subject to any disclaimer, the term of this patent is extended or adjusted under 35 U.S.C. 154(b) by 42 days.

This patent is subject to a terminal disclaimer.

(21) Appl. No.: 17/473,945

(22) Filed: Sep. 13, 2021

(65) Prior Publication Data

US 2021/0409641 A1 Dec. 30, 2021

Related U.S. Application Data

(63) Continuation of application No. 16/432,804, filed on Jun. 5, 2019, now Pat. No. 11,122,237.

(Continued)

(51) Int. Cl.
*H04N 5/91* (2006.01)
*G06F 3/04845* (2022.01)
(Continued)

(52) U.S. Cl.
CPC ........... *H04N 5/91* (2013.01); *G06F 3/04845* (2013.01); *G06T 5/20* (2013.01); *G06T 7/20* (2013.01); *G06V 20/52* (2022.01); *G06V 20/59* (2022.01); *H04N 5/272* (2013.01); *G06F 3/04842* (2013.01); *G06T 5/002* (2013.01);
(Continued)

(58) Field of Classification Search
CPC ........ H04N 5/91; H04N 5/272; H04N 9/8205; H04N 5/77; G06K 9/00771; G06K 9/00832; G06K 2209/03; G06T 7/20; G06T 5/20; G06T 2207/20024; G06T 2207/10016; G06T 2207/30232; G06T 5/002; G06F 3/04845; G06F 3/04842; G06F 1/163; G06F 1/1686
See application file for complete search history.

(56) References Cited

U.S. PATENT DOCUMENTS 6,501,856 B2 12/2002 Kuwano et al.
7,616,814 B2 11/2009 Wolf et al.
(Continued)

*Primary Examiner* — Boubacar Abdou Tchoussou
(74) *Attorney, Agent, or Firm* — Andrew Graham

(57) ABSTRACT

Systems, devices, and methods redact one or more light-emitting screens in data recorded on a recording device. The redaction may include receiving recorded data comprising a plurality of pixel values. The redaction may include detecting one or more light-emitting screens in the received image. The redaction may include redacting a subset of the pixel values from the recorded associated with the one or more detected light-emitting screens. The redaction may be commonly applied to multiple frames of recorded data through the use of a unique identifier assigned to a same detected light-emitting screen. A same light-emitting screen may be tracked across multiple non-sequential or sequential frames and assigned a same unique identifier.

20 Claims, 8 Drawing Sheets

Related U.S. Application Data

(60) Provisional application No. 62/837,719, filed on Apr. 23, 2019, provisional application No. 62/681,084, filed on Jun. 5, 2018.

(51) Int. Cl.
*G06T 5/20* (2006.01)
*G06T 7/20* (2017.01)
*G06V 20/52* (2022.01)
*G06V 20/59* (2022.01)
*H04N 5/272* (2006.01)
*G06F 3/04842* (2022.01)
*G06T 5/00* (2006.01)

(52) U.S. Cl.
CPC ............... *G06T 2207/10016* (2013.01); *G06T 2207/20024* (2013.01); *G06T 2207/30232* (2013.01)

(56) References Cited

U.S. PATENT DOCUMENTS

| | | | |
|---|---|---|---|
| 8,306,353 B2 | 11/2012 | Miyake | |
| 9,111,239 B2 | 8/2015 | Minert et al. | |
| 9,426,387 B2* | 8/2016 | Jung | G06V 20/52 |
| 9,613,427 B2 | 4/2017 | Chen et al. | |
| 9,740,860 B2 | 8/2017 | Song | |
| 9,836,484 B1 | 12/2017 | Bialynicka-Birula et al. | |
| 9,881,171 B2* | 1/2018 | Bellamy | G06F 21/84 |
| 10,452,892 B2* | 10/2019 | Hanai | G06V 20/20 |
| 10,825,479 B2* | 11/2020 | Hershfield | H04N 7/186 |
| 11,244,488 B2* | 2/2022 | Watanabe | H04N 7/18 |
| 11,301,966 B2* | 4/2022 | Greasley | G06T 5/004 |
| 2015/0332439 A1 | 11/2015 | Zhang et al. | |
| 2016/0150188 A1* | 5/2016 | Ha | H04N 23/69 |
| | | | 348/143 |
| 2016/0246996 A1 | 8/2016 | Khoo et al. | |
| 2017/0061258 A1 | 3/2017 | Chen et al. | |
| 2017/0109591 A1 | 4/2017 | Sakuragi | |
| 2018/0101723 A1 | 4/2018 | Wakako et al. | |
| 2018/0268240 A1 | 9/2018 | Loce et al. | |
| 2019/0019068 A1 | 1/2019 | Zhu et al. | |
| 2019/0068895 A1 | 2/2019 | Hutz et al. | |
| 2019/0147185 A1* | 5/2019 | Cai | G06V 40/173 |
| | | | 726/30 |
| 2019/0304506 A1 | 10/2019 | Michaud et al. | |
| 2019/0318106 A1* | 10/2019 | Yu | G08B 13/196 |

\* cited by examiner

SYSTEMS AND METHODS FOR REDACTION OF SCREENS

FIELD OF INVENTION

Embodiments of the present disclosure relate to redacting data associated with light-emitting screens.

BRIEF SUMMARY

The following presents a simplified summary of the present disclosure in order to provide a basic understanding of some aspects of the embodiments disclosed herein. This summary is not an extensive overview of the invention. It is not intended to identify key or critical elements of the invention or to delineate the scope of the invention. The following summary merely presents some concepts of the invention in a simplified form as a prelude to the more detailed description provided below.

Embodiments according to various aspects of the present disclosure include a system for redacting one or more light-emitting screens recorded in video data at an incident. The system may comprise a body-worn camera configured to be worn by a law enforcement officer. The camera may comprise an image sensor configured to capture one or more images, a first memory configured to store instructions for recording the video data, and a first processing circuit configured to execute the instructions for recording the video data, wherein execution of the instructions causes the first processing circuit to record the one or more images in the video data, and upload the video data. The system may also comprise a redaction computing device configured to receive the uploaded video data. The redaction computing device may comprising at least one second memory configured to store the video data uploaded from the camera and instructions for redaction and a second processing circuit configured to execute the instructions for redaction, wherein execution of the instructions for redaction causes the second processing circuit to detect a light-emitting screen in each image of the one or more images in the video data, redact each image of the one or more images in accordance with the detected light-emitting screen in each image of the one or more images in the video data, and provide the one or more redacted images for display. Detecting the light-emitting screen in each image of the one or more images may comprise identifying a subset of pixels in each image associated with the light-emitting screen. Detecting the light-emitting screen in each image of the one or more images may comprise concurrently providing an indication of the identified subset of pixels in a first image of the one or more images for display and identifying the subset of pixels in a second image of the one or more images. Detecting the light-emitting screen in each image of the one or more images may comprise generating a mask associated with the identified subset of pixels and providing the redaction mask for display. An area of the mask may be greater than an area of the identified subset of pixels. Detecting the light-emitting screen may comprise tracking a same light-emitting screen between a first image of the one or more images and a second image of the one or more images. At least one of the detected light-emitting screens may be a screen of a mobile data terminal mounted in a vehicle. Detecting the light-emitting screen in each image of the one or more images may comprise detecting two or more light-emitting screens in a same image of the one or more images. Detecting the light-emitting screen in each image of the one or more images may comprise applying the video data to a neural network previously trained on separate images each comprising one or more annotated light-emitting screens. Redacting each image of the one or more images may include receiving a selection associated with each detected light-emitting screen and redacting each image in accordance with the selection. The selection may include a mask edit and redacting each image includes redacting each image in accordance with the mask edit. The selection may include a default selection provided by the redaction computing device. The one or more images may include a plurality of images and the selection may include a selection of a mask segment associated with a same light emitting screen across the plurality of images.

Embodiments according to various aspects of the present disclosure include a redaction computing device for redacting light-emitting screens in one or more images recorded at an incident. The device may comprise at least one memory configured to store instructions for redaction and at least one processing circuit configured to execute the instructions. Execution of the instructions by the at least one processing circuit may causes the at least one processing circuit to receive one or more images, detect a light-emitting screen in a first image of one or more images, redact the first image of the one or more images in accordance with the detected light-emitting screen in the first image of the one or more images, and store the redacted first image in the at least one memory. The one or more images may include at least one image captured by a body-worn camera of a law enforcement officer. The one or more images may include at least one image captured in a pre-event buffer prior to recording of the one or more images in video data. The detected light-emitting screen is a screen of one of a mobile data terminal mounted in a vehicle and a mobile communications device. Detecting the light-emitting screen in the first image may comprise generating a mask associated with the detected light-emitting screen and transmitting the mask to a remote computing device. Redacting the first image may comprise receiving a selection associated with the transmitted mask from the remote computing device and applying a redaction filter to the first image in accordance with the received selection.

Embodiments according to various aspects of the present disclosure include a computer-implemented method for redacting video data recorded at an incident. The method may comprise receiving an image, the image comprising a plurality of pixel values, detecting a light-emitting screen in the received image, and redacting a subset of the pixel values associated with the detected light-emitting screen. The received image may be captured inside a vehicle.

Embodiments according to various aspects of the present disclosure include a computing device for redacting light-emitting screens captured in one or more images recorded at an incident. The device may comprise at least one memory configured to store instructions for redaction and at least one processing circuit configured to execute the instructions, wherein execution of the instructions by the at least one processing circuit may causes the processing circuit to transmit an instruction to detect one or more light-emitting screens in one or more images in video data, receive a respective mask for or associated with each image of the one or more images in the video data in which at least one of the one or more light-emitting screens is detected, and transmit an instruction to extract redacted video data from the video data, wherein the redacted video data may include at least one image of the one or more images redacted in accordance with the received mask associated with each image of the at least one image of the one or more images. Transmitting the instruction to detect may comprise an indication of a selected redaction type of light-emitting screens. The selected redaction type of light-emitting screens may be a first redaction type among a plurality of redaction types provided for selection by the processing circuit. The plurality of redaction types may include one or more of a redaction type associated with faces and redaction type associated with license plates. Receiving the mask may include displaying each mask overlaid on the image with which the mask is associated. Receiving the mask may include receiving a mask segment associated with a same detected light-emitting screen in a sequence of images in the video data. Transmitting the instruction to extract may comprise receiving a selection of the mask segment. Receiving the mask may include displaying a first mask associated with a first image of the one or more images prior to receiving a second mask associated with a second image of the one or more images. The first mask and second mask may be included in a same mask segment. Transmitting the instruction to extract may comprise receiving a selection. The selection may be received via a user interface of the computing device. The selection may include a mask edit for at least one received mask of the one or more masks received for each image of the one or more images of the video data. The selection may include a default selection received from a remote computing device. Transmitting the instruction to extract may comprise transmitting a selection associated with at least one received mask of the one or more masks received for each image of the one or more images of the video data. At least one of the one or more detected light-emitting screens may be a screen of a mobile data terminal mounted in a vehicle.

Embodiments according to various aspects of the present disclosure include a non-transitory computer-readable medium comprising computer-executable instructions for redacting light-emitting screens. When executed by a processing circuit of a computing device, the instructions may cause the processing circuit to at least determine an image in which a light-emitting screen is detected, determine a mask associated the detected light-emitting screen for display, and extract redacted media, wherein the extracted media includes a redacted image associated with the determined image and the determined mask for display. Determining the image may include receiving an instruction to detect the light-emitting screen. Determining the mask may include generating the mask for display around a subset of pixels associated with the detected light-emitting screen. Extracting the redacted media may include receiving a selection of the determined mask and redacting the determined image in accordance with the selection and the determined mask to provide the redacted image.

Embodiments according to various aspects of the present disclosure include a system for redacting light-emitting screens in an image recorded at an incident. The system may comprise a redaction computing device configured to detect a light-emitting screen recorded in the image, transmit an indication of the detected light-emitting screen, and extract redacted media comprising a redacted image in which pixels in the image associated with the detected light-emitting screen are redacted. The system may further comprise a client computing device configured to receive the indication of the detected light-emitting screen from the redaction computing device over a network, display a redaction mask associated with the detected light-emitting screen, and transmit an instruction associated with the displayed redaction mask, wherein the redaction computing device may be configured to extract the redacted media in accordance with the transmitted instruction.

BRIEF DESCRIPTION OF THE SEVERAL VIEWS OF THE DRAWING

Embodiments of the present disclosure will be described with reference to the drawings, wherein like designations denote like elements, and.

DETAILED DESCRIPTION OF INVENTION

Figure 1:
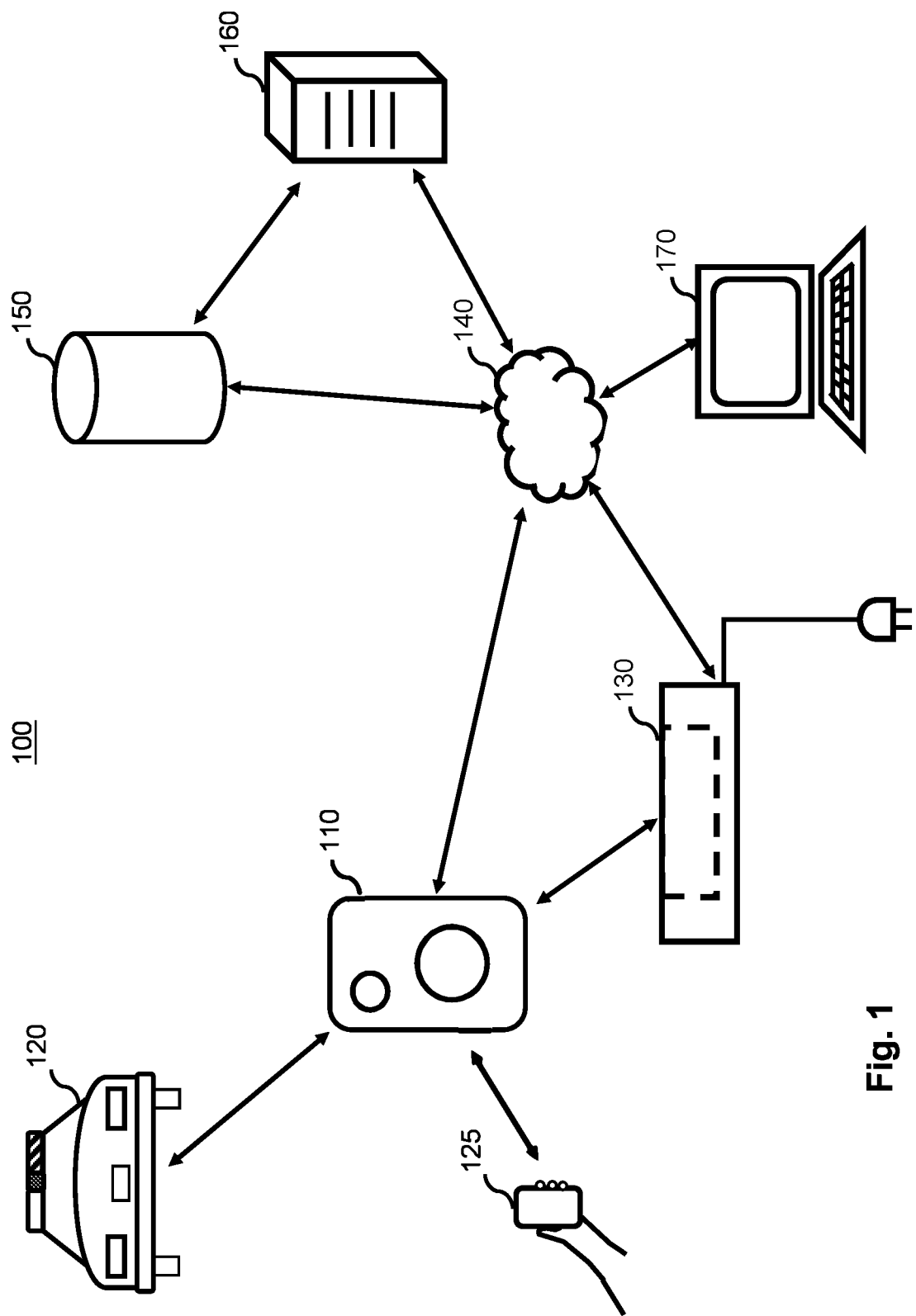
FIG. 1 is a diagram of example devices associated with an example system for generating and redacting data from an incident according to various aspects of the present disclosure.

Police officers use recording devices (e.g., cameras, body-worn cameras, vehicle cameras, microphones, wireless microphones) to record data related to what happens (e.g., occurrences) at an incident (e.g., event). The data recorded at the incident may be used as evidence of what happened at the incident. The data may be recorded starting before the recording device arrives at the incident. The data may alternately or additionally be recorded after the incident is resolved and while the recording device is at a location of the incident.

Data may be recorded upon activation of a recording device. The data may be recorded based on manual activation. In embodiments, the data may also be recorded automatically without direct control or input from a user. For example, data may be recorded automatically when a firearm is removed from a holster. Alternately, a recording device may begin storing data when a predetermined sound is detected, such as a sound determined to be a gunshot. In embodiments, the recording device may automatically initiate recording when a predetermined condition is sensed, such as by a sensor associated with the recording device, independent of a manual input received at a user interface of the recording device.

Recorded data may include data captured by the recording device prior to activation of the recording device. For example, the recording device may include a pre-event buffer that temporarily stores captured data. The recording device may save the temporarily stored data as part of the recorded data when data recording is initiated. The buffer may be one or more of a circular or first-in-first-out buffer. In embodiments, the recording device may capture and temporarily store thirty seconds or more of data that precede a time at which the recording device begins recording data. Upon activation of the recording device, the recording device may store the data from the buffer as recorded data in a second memory, along with data captured by the recording device after the activation of the recording device. The second memory may be a non-volatile, long-term memory. The recorded data, including any previously captured data from a pre-event buffer, may be stored for subsequent access and review.

Data may be recorded by a recording device from a perspective of a police officer. For example, the recording device may be a body-worn camera configured to be worn by a law enforcement officer to record data from the perspective of the law enforcement officer at an incident. From this perspective, the recording device may capture various objects, including those that are used or available for use by the law enforcement officer. Each of the various captured objects may be represented in one or more pixel values in one or more images in recorded data recorded by the recording device. Each of the various captured objects may be represented in one or more images in a sequence of images recorded as video data by the recording device.

Objects captured in recorded data may have a display. The display may be represented in the recorded data. The display may be visible in the recorded data upon later playback or other review. Content of the recorded data may depict the display of the captured object.

A display may output information visually at a time of recording of recorded data. The information may include media content comprising one or more of text data, image data, and video data. The information may include personal information or contextually sensitive information related to an incident at a location. Information from other, unrelated incidents may also be displayed by the display. The information may be visible in one or more pixel values of the recorded data. The information may be legible, discernable, or otherwise distinguishable in the recorded data.

In embodiments, recorded data may capture a display of a computing device. The display may be a user interface device for the computing device. The computing device may include a personal computing device, such as a laptop, desktop computer, and mobile communications device, and a wearable. A wearable may include a smart watch. A mobile communications device may include one or more of a smartphone and a tablet computer. In embodiments, the recorded data may capture one or more displays of one or more computing devices. Each display may be captured in one or more images of recorded data, including different images or one or more same images in recorded data.

A display may include a light-emitting screen. The light-emitting screen may be a portion of the display that outputs information visually. The light-emitting screen may comprise various technologies, including one or more of a liquid crystal display and a light emitting diode display. The light-emitting screen may emit or output light. The light-emitting screen may be a source of light. The light may be transmitted from the display via pixels of the screen. The light transmitted from the pixels may collectively form an image on the screen.

A screen of a display may have various sizes and shapes. A diagonal size of the screen, for example, may range from 1-2 inches for a smart watch; 3 to 8 inches for a mobile communications device or smartphone; or 11 to greater than 19 inches for a mobile data terminal. The shape of the screen may be planar. The shape of the screen may be rectangular. In embodiments, the screen may be square in shape.

In embodiments, content or information provided on a captured light-emitting screen may change over time. For example, the content may change among one or more sequences of images. The content represented in one or more pixels at different locations within the screen may differ over time. The content may change between different images captured of the light-emitting screen, including sequential images within recorded video data. The content of the display may change in accordance with a user input to a computing device that includes the display or is otherwise associated with the display. The content provided by a display may be variable and may not be predetermined. The change in content on a light-emitting screen may be represented in different pixel values in recorded in recorded data for the captured light-emitting screen.

In embodiments, a light-emitting screen is distinct from and excludes other rectangular, planar surfaces. For example, a light-emitting screen is different from a reflective surface, such as a license plate, which may only reflect light and be visible in recorded data, but is not itself a source of light. In another example, a light-emitting screen may be distinct from one or more signs that may be provided in an incident, including one or more lighted signs, as such signs may not change over time and may not be coupled to a computing device. The light-emitting screen may be different from other surfaces as well, including those that are not part of a user interface of a computing device. Such screens may also exclude images or screens that are not present in data captured at a recording device. For example, such excluded screens may include overlays or other picture-in-picture compositions added to video data after it was recorded or added to video data from a separate recording device.

A display may include a bezel. The bezel may be provided at an edge of one or more surfaces of the display. The bezel may not emit light. The bezel may not change color. The appearance of the bezel may not be altered between different images in recorded data. In embodiments, a light-emitting screen of the display may be surrounded on one or more sides via one or more non-light-emitting bezels. Each bezel may be narrow compared to a width or height of the screen to which they are adjacent.

In embodiments, a recording device may record data from inside a vehicle. From a viewpoint inside the vehicle, various objects may be captured in the recorded data by the recording device. The captured objects may include objects such as steering wheel, dashboard, rearview mirror, a mobile communications device, and a mobile data terminal. Certain objects captured from inside the vehicle may have a display. Certain captured objects inside a vehicle may have a display on which personal information or contextually sensitive information may be displayed. The personal or sensitive information may relate to a location of the vehicle or a location to which the vehicle is en route. Information from other, unrelated locations may also be displayed. The location may be a location of an incident.

A mobile data terminal (MDT) is a vehicle-mounted computing device. Such a device may be fixedly attached to the vehicle. An MDT may be hardwired to an electrical system in a vehicle to receive power. An MDT may also be hardwired into a communication network of the vehicle, thereby permitting the MDT to access a same communication network as other communication devices in the vehicle. Other communication devices may include a vehicle radio, which may be used to contact a dispatcher via a computer aided dispatch device. An MDT may include a display and keyboard, both of which may be provided on a mount above a center console adjacent a driver's seat of the vehicle. Other mounting positions inside a vehicle are possible in embodiments according to various aspects of the present disclosure.

The display may include a light-emitting screen. The light-emitting screen may be made from various types of technologies such as liquid crystal displays or light-emitting diode displays. The MDT may further include a central control unit with a processing circuit that controls various operations of the MDT. The operations may include one or more operations involving communication, records access, report drafting, and vehicle status display. The central control unit may be integrated with the display or keyboard or located elsewhere in the vehicle and connected to the display and keyboard via wired or wireless communication devices. In some embodiments, the central control unit, display, and keyboard may be part of a laptop computer, fixedly or securely attached to the vehicle by the mount. The mount may orient the display and keyboard in the direction of the driver's seat. Such an arrangement permits a police officer to perform various actions with the MDT while seated in the driver seat, including entering incident report information via the keyboard or viewing incident records on the MDT display.

Because data may be recorded from the perspective of an officer and/or because data may be recorded of an officer at work, the recorded data may include an image captured of one or more light-emitting screens. Cameras used in a law enforcement context may have high enough resolution and/or may be positioned close enough to a light-emitting screen to render text, colors, images, and/or other information on a screen visible and/or legible in recorded image or video data.

Data recorded at an incident may be released to the public. For example, video data of an incident may be release to news agencies that report to the public regarding an incident. Recorded data may be redacted prior to public release. Recorded data may be redacted to obfuscate personal or sensitive information. Recorded data may be redacted to protect the identities of people or to remove identifying information as to place or time. Recorded data may also be redacted to protect information relating to ongoing investigations and other police-related incidents. Such video data may be required to be redacted for various reasons.

Yet, as noted above, a police operator may not control if a device begins recording, nor may she or he know when recording may begin. This presents a unique technological situation where many sets of record data include data related to objects that should not have been recorded or should not be included in the record data when it is released to the public. A recording device is caused to record information that should and should not be recorded. The recording context also provides a unique situation where a camera is oriented toward a light-emitting screen, rather than being part of a same device, which might otherwise render a screen not visible. The cameras or recording devices are operating properly and as intended, yet the recorded data still needs correction and adjustment before being further distributed. Based on normal use, the recorded data decreases security of computer-stored data that may be otherwise secure.

Embodiments of the invention address this technology-based issue by automatically redacting data associated with light-emitting screens. Such redaction may be performed with minimal user intervention or without manual input entirely. A light-emitting screen may be automatically identified and then removed without a user input being directly applied to select or otherwise specifically identify the light-emitting screen in recorded data. Many steps of the redaction process may be performed without or independent of user input, including between sequential processing steps. Such automatic processing may be based on configuration of a server or other processing device on which redaction is performed in advance of execution of redaction on a frame. Such automatic processing may also be based on data that is identified by the computing device during execution of a processing step and then handled by the same computing device during a subsequent processing step of the same overall execution of a method in accordance with embodiments of the present disclosure. The data being redacted may not be located, identified positionally, or otherwise indicated to a computing device before the computing device begins executing methods or steps according to various aspects of the present disclosure.

A light-emitting screen in many embodiments according to various aspects of the present disclosure is present in an initial physical environment at which a recording device is located. The light-emitting screen may be captured optically by a lens of the recording device, and then converted into image data or video data using an image sensor of the recording device. The data generated by an image sensor captures the light-emitting screen in the form of pixel values. The pixel values may represent a combination of component intensities at a location or pixel in an image. For example, the pixel values may provide intensities for a luma component and two color difference components, though other types of pixel values may also be employed in embodiments according to various aspects of the present disclosure. Pixel values may be provided for each position in an array of data. Each position may correspond to a pixel in the array of data. An array of data may include two dimensions of data, representing pixel values captured at each combination of positional height and width of an image sensor. The pixel values in the array may collectively form an image. The image may comprise a plurality of pixels, each pixel having one or more pixel values. Video data may include a sequence of images, wherein each image corresponds to a frame of the video data. An object in data captured by an image sensor, including the light-emitting screen, may be shown in a subset of pixels with associated pixel values that form an overall image. Such an object may also commonly be presented in several sequential frames of data that form an image. An object may also be represented in pixel values of one or more frames, then not represented in pixel values for one or more subsequent frames, before reappearing in further subsequent pixel values as discussed with respect to the examples below.

FIG. 1 illustrates an example arrangement for redacting recorded data. The example arrangement includes example devices associated with an example system for generating and redacting data from an incident according to various aspects of the present disclosure. The recorded data may include audio/visual data. The visual data may include video data. The recorded data including video data may be recorded by camera 110. Camera 110 may be a body-worn camera configured to be worn by a user. A body worn camera, such as camera 110, may be attached to a law enforcement officer to perform recording during an incident. This recording may be performed at a location at which a vehicle 120 is present. This vehicle 120 may include an MDT and MDT light-emitting screen as discussed elsewhere herein. The MDT screen may be visually represented in the recorded data. This recording may alternately or additionally be performed at a location at which a mobile communications device 125 is present. This device may include a mobile communications device light-emitting screen as discussed elsewhere herein. The light-emitting screen of the mobile communications device may be visually represented in the recorded data. The recorded data may be uploaded (e.g., transmitted) to a server 160 in various ways. The camera 110 may upload the recorded video via a dock 130, which may have a wired and/or wireless connection to server 160 by way of network 140. Alternately, camera 110 may transmit the recorded data directly to the server 160 by way of network 140 via a long range wireless connection, such as though an LTE communications channel and network. In some embodiments, the server 160 and/or the camera 110 may also transmit the recorded data to data store 150. Upon extraction, the data store 150 may also store redacted recorded data. The recorded data, as well as redacted recorded data, may be accessible for viewing at computing device 170. The recorded data and redacted data may be accessible at device 170 via network 140. The server 160 and computing device 170 may include various components, including those shown in FIG. 7 and/or further discussed below.

While single instances of devices are shown in FIG. 1, embodiments according to various aspects of the present disclosure may include those in which multiple instances of devices are provided, including multiple vehicles 120 or multiple mobile communications devices 125. Systems according to various embodiments of the present invention may also include different sets of these devices. Although camera 110 is provided as an example of a recording device and audio/visual data as an example of recorded data, recording devices are not limited to cameras or video cameras and recorded data is not limited to audio/visual data (e.g., information).

In embodiments according to various aspects of the present disclosure, recorded data may comprise recorded video data. Video data may comprise a plurality of sequential images, wherein each image corresponds to a frame of the video data. Each image comprises an array of pixels. Each pixel comprises one or more values captured by a sensor of a camera or other recording device on which the video data including each pixel is generated.

In embodiments, video data may be recorded in a media file. The video data may be included in a media data portion of the mediate file. The video data in the media file may be recorded during a single incident. The media file may include video data recorded by a same recording device. Each image in the video data of the media file may be recorded by a same recording device.

A media file may include recorded video data along with metadata. An arrangement of metadata and video data in the media file may be determined in accordance with a container. The metadata may include data related to the video data. For example, metadata may include one or more of a file name, file creation date, and other metadata related to a media file in which video data is included. The media file may include metadata in one or more headers. Metadata may alternately or additionally be interspersed in one or more locations in a media file.

A media file may also include audio data. The audio data may be included in a media data portion of the media file, along with video data. The audio data may be interleaved with video data in a media file. The media file may include video data, metadata, and audio data multiplexed, arranged, or otherwise combined in various manners.

Figure 2:
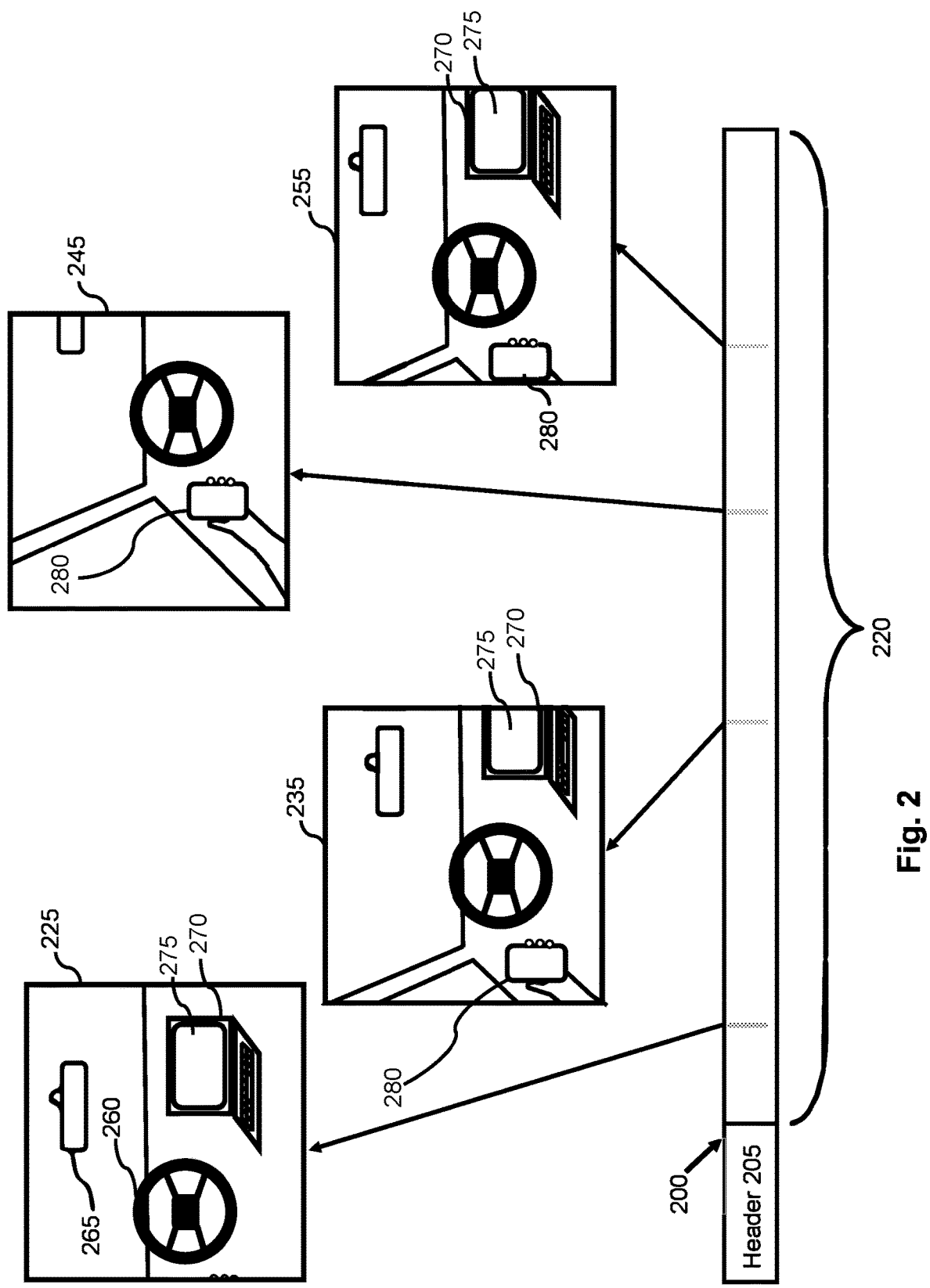
FIG. 2 is a diagram illustrating example content for redaction in video data according to various aspects of the present disclosure.

An example of recorded data is shown in FIG. 2. Recorded data is shown in FIG. 2 as part of a media file 200. File 200 includes recorded video data and metadata. File 200 includes a header 205. Header 205 includes metadata related to the video data in file 200. The metadata may include file name, file creation date, and other metadata regarding the file 200. File 200 also includes video data comprising frames 220. The frames 220 are included in a media data portion of file 200. Content of frames 220 of the video data may correspond to a field of view of a camera, such as camera 110 or another recording device. Each object represented in the video data was located within a field of view of the camera or other recording device upon capture of the video data. Frames 220 comprise original video data as captured by the camera or other recording device. Frames 220 include unredacted video data. Frames 220 in the example media file 200 are recorded from the perspective of a police officer in a vehicle. In embodiments, one or more images or frames of recorded data may be captured inside a vehicle. Various objects are captured in frames 220 of the media file 200.

Four example frames of video data are illustrated. Content of these specific frames among frames 220 is illustrated in FIG. 2. As illustrated, these frames are shown in chronological order of being captured and recorded from left to right in FIG. 2. In a first frame 225, a steering wheel 260, rearview mirror 265, and an MDT 270 with an MDT screen 275 are visible within the visual content of the frame, captured within the pixel values of the frame. The rearview mirror 265 comprises a reflective, but non-light-emitting surface. The keyboard and the screen 275 of the MDT 270 are both represented in pixel values of the video data as shown. First frame 225 includes pixel values representing MDT 270 and MDT screen 275 along with other objects 260,265. Additional devices with light emitting screens may be present in an environment in which frame 225 is recorded, though outside the field of view captured in the recorded video data.

At second, later point in time, a second frame 235 is captured. In this frame, the objects of the first frame 225 have been shifted to the right and a field of view has shifted to the left. The MDT screen 275 and keyboard remain visible, though they are not entirely captured in the pixel values of the frame 235 as they were in frame 225. The shift in field of view has captured a second light-emitting screen. This screen corresponds to a screen of a mobile communications device 280. In embodiments, mobile communications device 280 may correspond to mobile communications device 125. As noted above, this device may be a smartphone, wearable computing device, or tablet computer. In some embodiments, this device 280 may also include another body-worn camera, wherein the body-worn camera has a light-emitting screen as part of its user interface.

In a third frame 245, the field of view has shifted further to the left and the objects in the captured field of view have thus shifted further to the right. The MDT may be present in an environment in which frame 245 is recorded, but it is no longer visible in frame 245 compared to previous frames, though the mobile communications device 280 remains fully visible in the frame 245.

In a fourth frame 255, a field of view captured by the recording device that recorded frames 220 has shifted back to the right. The same MDT 270 with its screen 275 and keyboard are again visible. The screen of the mobile communications device 280 remains visible, though its relative location within the frame 255 has changed.

While frames 225, 235,245,255 illustrate an example in which the field of view changes, embodiments according to various aspects of the present disclosure also may be applied to recorded data in which the objects within the field of view alternately or additionally change position. For example, this may include a mobile communications device moving around, in and out of a captured field of view in accordance with manual motion or input applied to the device. Recorded data processed in embodiments according to various aspects of the present disclosure may also include only a single image of data, rather than multiple frames of recorded data.

Figure 3:
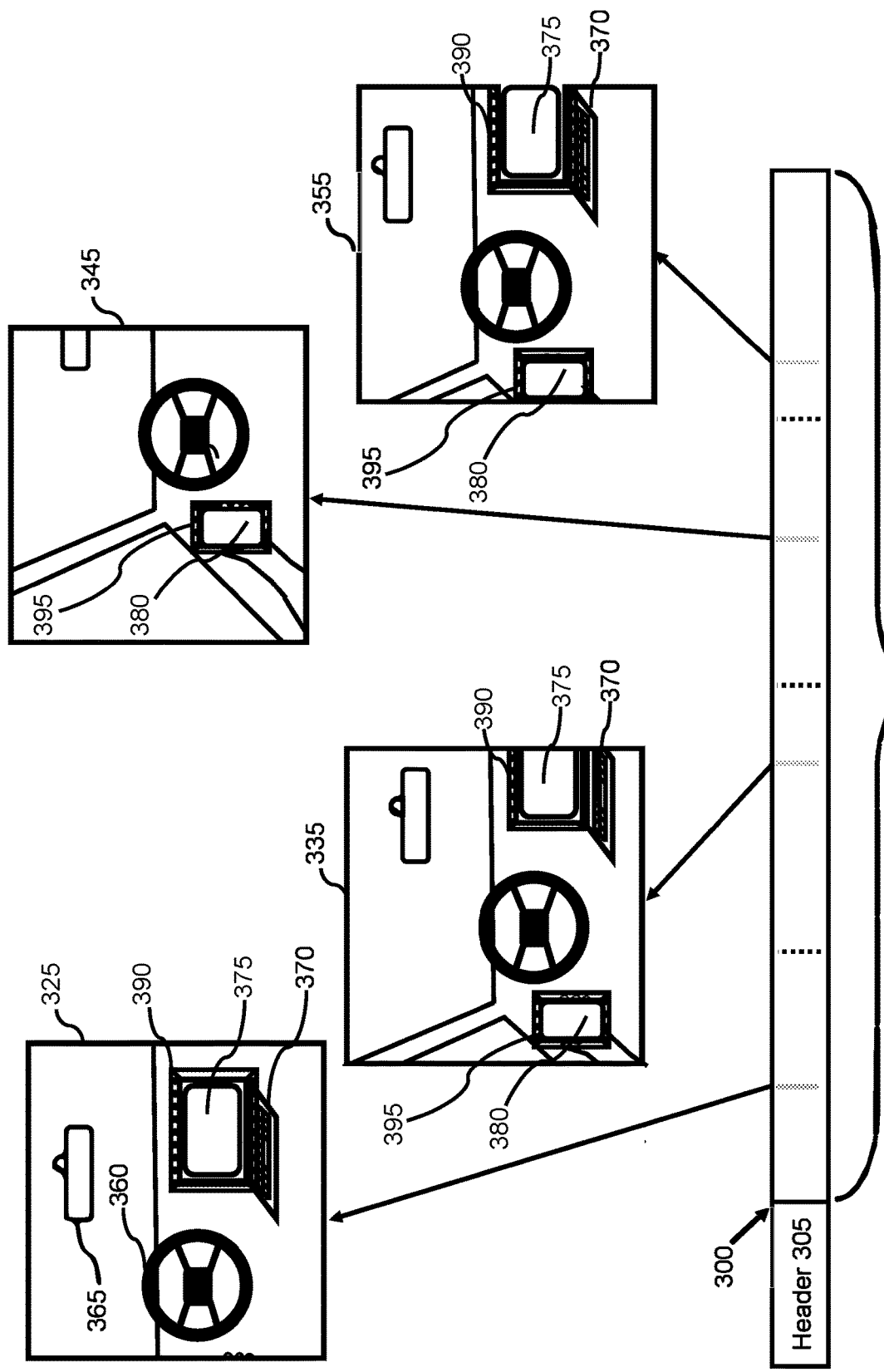
FIG. 3 is a diagram illustrating example content identified for redaction from video data according to various aspects of the present disclosure.

FIG. 3 illustrates the example recorded data of FIG. 2 after processing by embodiments according to various aspects of the present disclosure. The recorded data in FIG. 3 may correspond to recorded data as displayed on a user interface of a computing device, such as computing device 170 in FIG. 1, after the processing. For example, an instruction to detect light-emitting screen in file 200 may have been transmitted from computing device 170 to server 160 and, after processing, may have returned data (e.g., information) for display on computing device 170 corresponding to frames shown in FIG. 3. In embodiments, the data may be overlaid for display on a detected light-emitting screen.

In embodiments according to various aspects of the present disclosure, processing recorded data includes detecting a light-emitting screen in the recorded data and generating metadata associated with the detected light-emitting screen. For example, light-emitting screens in frames 220 in FIG. 3 have been detected and metadata indicative of the detected light-emitting screens has been generated. The metadata may comprise additional data pertaining to the detected light-emitting screens. The metadata may be generated after a request or instruction to detect a light-emitting screen in recorded data has been received, transmitted, or provided by or from a computing device. The metadata may enable subsequent redaction of one or more detected light-emitting screens in recorded data. The metadata may be provided for subsequent processing, including being provided from a computing device to another computing device, as well as being provided as output to a user.

Metadata pertaining each detected light-emitting screen may include a boundary of the detected light-emitting screen in each of one or more frames. The boundary may comprise or indicate a set of pixel locations in recorded data that enclose pixels with pixels values that represent a detected light-emitting screen. In embodiments, the boundary may include a boundary box. In other embodiments, the boundary may alternately include a non-rectangular shape. For example, the boundary of a detected light-emitting screen may be represented by one or more of a triangular, non-rectangular, non-linear, and/or curved shape. The boundary may be displayed or displayable on a user interface of a computing device. The boundary may form the basis of other metadata which may be subsequently provided for display on a user interface of a computing device. The boundary may include at least one pixel location with which the boundary is disposed within the image or frame. The boundary may include at least one dimension along which an edge of the boundary may be disposed with the image or frame. The boundary may include combinations of a pixel location and a dimension which, in combination, indicate an exact location in the image or frame with which the boundary is associated.

Metadata pertaining each detected light-emitting screen may also include a mask. The mask may visually indicate a location of a detected light-emitting screen in a frame or image. The mask may provide a visual indication of one or more pixels to be redacted. For example, the mask may include a border that encloses one or more pixels in a frame or image. The mask may alter a color of one or more pixels to which is it applied. A mask may alter a brightness of one or more pixels to which it is applied. A border of a mask may be opaque, while an area enclosed by a mask may be at least partially transparent, allowing pixels associated with the mask to remain visible. An area of the mask may be greater than an area of a detected light-emitting screen. For example, an area of the mask for a light-emitting screen may include a greater number of pixels than a detected boundary of the light-emitting screen. The mask may include at least one pixel location with which the mask is selected to be disposed within the image or frame. The mask may include at least one dimension along which an edge of the mask may be disposed with the image or frame. The mask may include combinations of a pixel location and a dimension which, in combination, indicate an exact location in the image or frame with which the mask is associated. In embodiments, detecting a light-emitting screen in each image of video data may comprise identifying a subset of pixels in each image associated with the light-emitting screen. The subset of pixels may correspond to one or more of a boundary and a mask generated for the detected light-emitting screen.

In embodiments, a shape of a mask may correspond to a shape of a detected light-emitting screen. For example, the mask may be rectangular in shape. The mask may have a warped shape. For example, one or more sides of a mask may be angled toward or away from another side of the mask, conforming to a shape of a light-emitting screen in an image. In embodiments, a shape of a mask may be selected to match a detected light-emitting screen. The shape of the mask may exclude a bezel adjacent the detected light-emitting screen. The shape of the mask, including its size, may be equal or greater than the shape of a detected light-emitting screen, but less than a shape of a bezel for a same display including the light-emitting screen. Such a shape may leave a device associated with the detected light-emitting screen visible in subsequently redacted data, yet not reveal contextually sensitive or personally identifiable information from this device. Such a shape may allow a user to later confirm that a redaction was applied to a light-emitting screen and not some other, non-sensitive object in a frame.

In embodiments, a detected light-emitting screen may have a corresponding boundary and a corresponding mask. The mask may be related, but separate from the boundary. For example, a mask may correspond to one or more different pixels in a frame compared to a boundary. A mask may be automatically or manually determined relative to a boundary. A mask be set equal to a boundary by default. For example, an initial mask may be automatically determined by a redaction computing device to correspond to a boundary of a detected light-emitting screen. In another example, the mask may be set as a predetermined number or other amount of pixels greater than a boundary along each edge of the boundary. The mask may then be manually or automatically adjusted relative to the boundary. Accordingly, the mask may be related, but separate from a boundary for a given detected light-emitting screen.

In embodiments, a mask may be selected to be larger than a detected light-emitting screen. The mask may be bigger and have a greater number of pixels relative to a number of pixels associated with the detected light-emitting screen. The mask may be associated with pixels determined to represent a detected light-emitting screen and pixels that are not determined to represent the detected light-emitting screen but are adjacent the pixels determined to represent the detected light-emitting screen. For example, a light emitting screen may be determined to have a first boundary among pixels in a frame. In embodiments, the first boundary may correspond to a border of a boundary box of the detected light-emitting screen. A mask with a second boundary among pixels in the frame may be provided for the light-emitting screen, wherein the second boundary is greater than the first boundary. The second boundary may enclose the first boundary. The second boundary may be disposed on pixels not determined to represent the light-emitting screen. The second boundary may enclose pixels that are not determined to represent a detected light-emitting screen. The second boundary may be disposed on pixels different from the first boundary. By having a second boundary greater than the first boundary, a light-emitting screen may be visible within a mask and not be obscured by the second boundary.

In embodiments, a mask may represent one or more pixels that may be subsequently redacted. As such, a second boundary of a mask that is greater than a first boundary may ensure that pixels associated with a detected object are redacted. The larger boundary may ensure that pixels are redacted including when a boundary of a light-emitting screen may be larger than detected and/or when a light-emitting screen may be blurred or otherwise imprecisely captured across multiple pixels in original video data.

In embodiments, a mask may be selected to be at least a predetermined size greater than an area of pixels determined to represent a detected light-emitting screen. The mask may automatically be selected to be greater by a computing device, such as a redaction computing device. For example, the mask may be selected to extend a minimum number of pixels beyond a boundary of pixels determined to represent a detected light-emitting screen. The mask may include dimensions of a width and a height, wherein each dimension extends at least a minimum number of pixels beyond a maximum dimension of a detected light-emitting screen in a corresponding direction. Other manners of selecting a size of the mask to be greater than a detected light-emitting screen may also be employed in embodiments according to various aspects of the present disclosure.

In other embodiments, a mask may be smaller than a boundary for a detected light-emitting screen. For example, a boundary for a detected light-emitting screen may include a boundary box. The boundary box may include both pixels representing both a bezel and a light-emitting screen of a display of a device. This may occur when a light-emitting screen is angled relative to a field of view of a recording device, wherein the light-emitting screen is represented in a warped or skewed set of pixels relative to vertical and horizontal dimensions of the frame. The boundary box may include pixels that do not need to be redacted. Accordingly, the mask may be generated to correspond to a subset of the pixels enclosed within the boundary box in this example. For example, the mask may be generated corresponding to pixels that represent a screen portion of the detected light emitting screen and exclude pixels that represent a bezel of the device on which the light-emitting screen is provided. The mask may be skewed, warped, or otherwise determined to be non-rectangular, thereby conforming to a shape of the detected light-emitting screen of a display in recorded data.

In the shown example frames of FIG. 3, a mask corresponding to a bounding box is illustrated on each detected light emitting screen illustrated within the frames. Masks are applied to the MDT screen as well as the screen of the mobile communications device when shown in a frame. For example, MDT screen 375 of MDT 370 has an applied mask 390 in example frame 325. The mask 390 is overlaid on recorded data comprising the MDT screen 375. A mask 395 is applied to a screen of mobile communications device 380 as well. Masks 390 and 395 enclose pixels associated with detected light-emitting screens of MDT 370 and mobile communications device 380 in subsequent frames 335, 345, and 355 as well. For some frames, multiple light-emitting screens may be detected and multiple masks may be generated for display, such as masks 390 and 395 for frames 335 and 355. In other frames, a single light-emitting screen may be detected and a single corresponding mask may be generated, such as mask 390 in frame 325 or mask 395 in frame 345. As illustrated, the masks 390 and 395 include a border that encloses light-emitting screens of MDT 370 and mobile communications device 380. In other embodiments, a mask may partially cover or fully cover one or more pixels of a detected light-emitting screen to indicate an area of a frame detected to represent the light-emitting screen. In other embodiments, a mask may be transparent. The mask may indicate an area of pixels currently selected for subsequent redaction, including those that may have been automatically selected for redaction.

Frames 325, 335, 345, and 355 illustrate frames for display after detection of light emitting screens such as screens 370,375. For example, frame 325 may be displayed on a display of computing device 170 after detection of pixels in frame 325 as being associated with a screen of an MDT 370. Frame 325 may correspond to frame 225 in which metadata comprising mask 390 has been overlaid for display. Each of the other frames 335, 345, 355 may also include respective frames 235, 245, 255 combined with metadata prior to display on a user interface device of a computing device. The metadata associated with each frame may be rendered with each frame upon display of each frame.

In embodiments, by displaying a mask on a frame in which a light-emitting screen has been detected, a user may confirm that a detected object is a light-emitting screen prior to redaction. Input may also be received to confirm, indicate, or otherwise control whether a detected object and/or set of pixels of a frame should be redacted. Pixels to be redacted may be previewed prior to application of a redaction filter to generate redacted video data.

Metadata may be separate from video data. The metadata may not be generated until corresponding video data has been processed. After initial generation, the metadata may be retained for separate processing relative to associated recorded data. By being held separate, the metadata may be confirmed, altered, or otherwise reviewed prior to being applied to the recorded data. The metadata may also be transmitted between computing devices separately from the video data or other recorded data.

In embodiments, generated metadata may be subsequently stored separately from the recorded data. For example, metadata associated with mask 390 may be associated with frame 325, but stored in a separate file or other data structure. A separate file may reference an associated media file and/or a media file may reference an associated metadata file, such that metadata in the metadata file may be employed in subsequent processing in combination with the media file. The metadata may be stored in a data store, wherein the recorded data may be stored in the same data store or a separate data store.

In embodiments, metadata related to one or more detected light emitting screens may be added to a media file. The metadata may be stored in a separate part of a media file from recorded data of the media file. For example, illustrated file 300 may have additional data added relative to the file 200. This additional data may include pixel location and bounding box dimensions for each frame in which a screen has been detected. This additional data may alternately or additionally include other metadata as well, such as one or more masks generated for each frame. A computing device, such as device 170, may use file 300 with this additional data to view frames 325,335,345,355 as displayed in FIG. 3. This additional data, which permits the bounding boxes to be displayed, is not included in the file as provided from camera 110 or other original recording device. The additional data may be interspersed among the video data in file 300 and/or stored in other locations such as header 305 of file 300. Other manners of handling metadata and associated recorded data may be employed in embodiments according to various aspects of the present disclosure as well, including those that employ a combination of metadata that is stored with and stored separately from the associated recorded data.

In embodiments, subsequent processing of metadata for a detected light-emitting screen may include redacting video data associated with the detected light-emitting screen. For example, pixel values associated with one or more pixel locations within a bounding box may be replaced by redacted pixel values at the one or more pixel locations within the bounding box. Other sets of data may be redacted as well, including those that are greater than or less than an area associated with a bounding box or other boundary of a detected light-emitting screen. Redaction of pixels relative to a bounding box or other boundary may be determined in accordance with a mask as noted above. One or more pixels associated with a border and an area within a mask in each frame may be redacted. Redacted video data comprising one or more redacted frames may be stored in an video file in which the video data was originally provided or, alternately, may be stored in a new media file. For example, frames with light-emitting screens in file 200 may be redacted and a new media file 300 may be created with frames 320 and metadata from file 200. Frames 320 may include the redacted frames and one or more unredacted frames from frames 220. In such an example arrangement, file 300 comprises a redacted media file and the video data of the file 300 comprises redacted video data.

Figure 4:
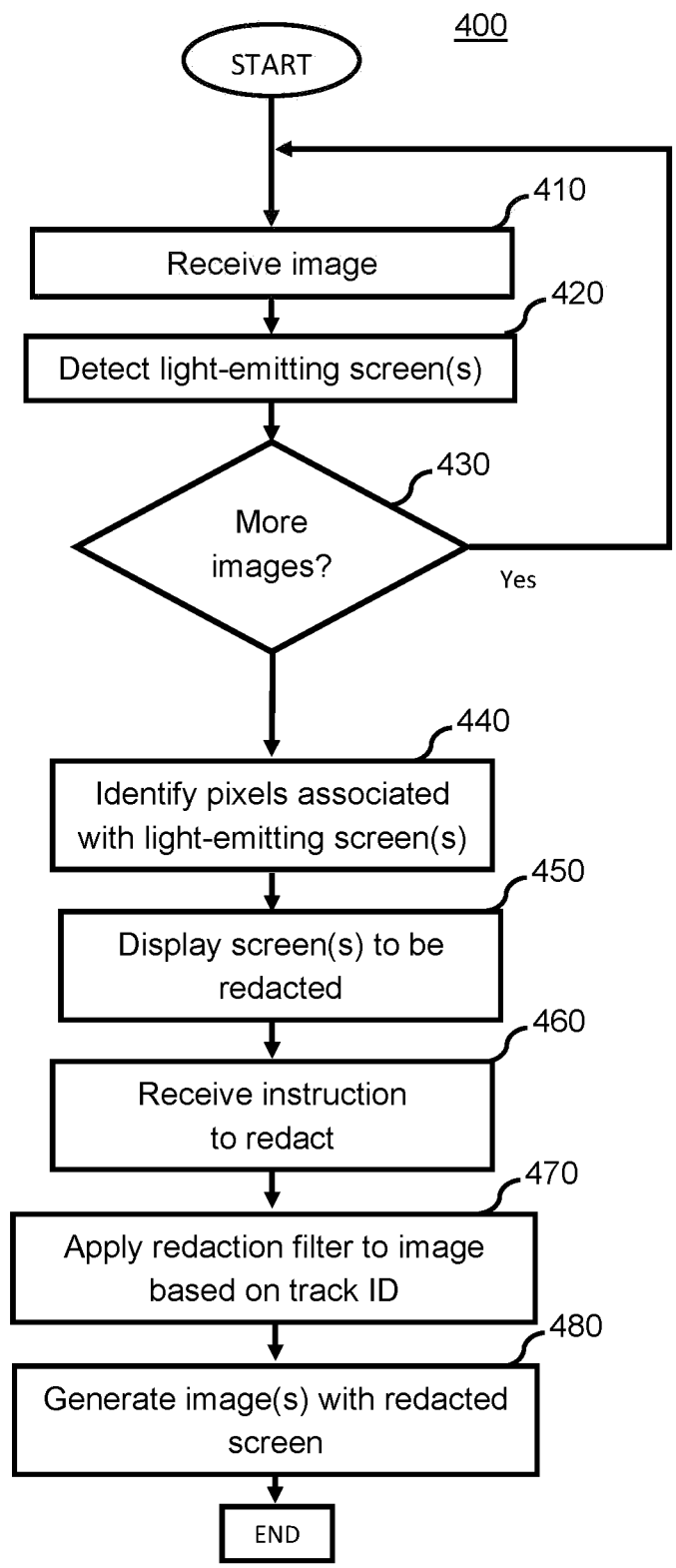
FIG. 4 is a diagram of an example method for redacting data according to various aspects of the present disclosure.
Figure 5:
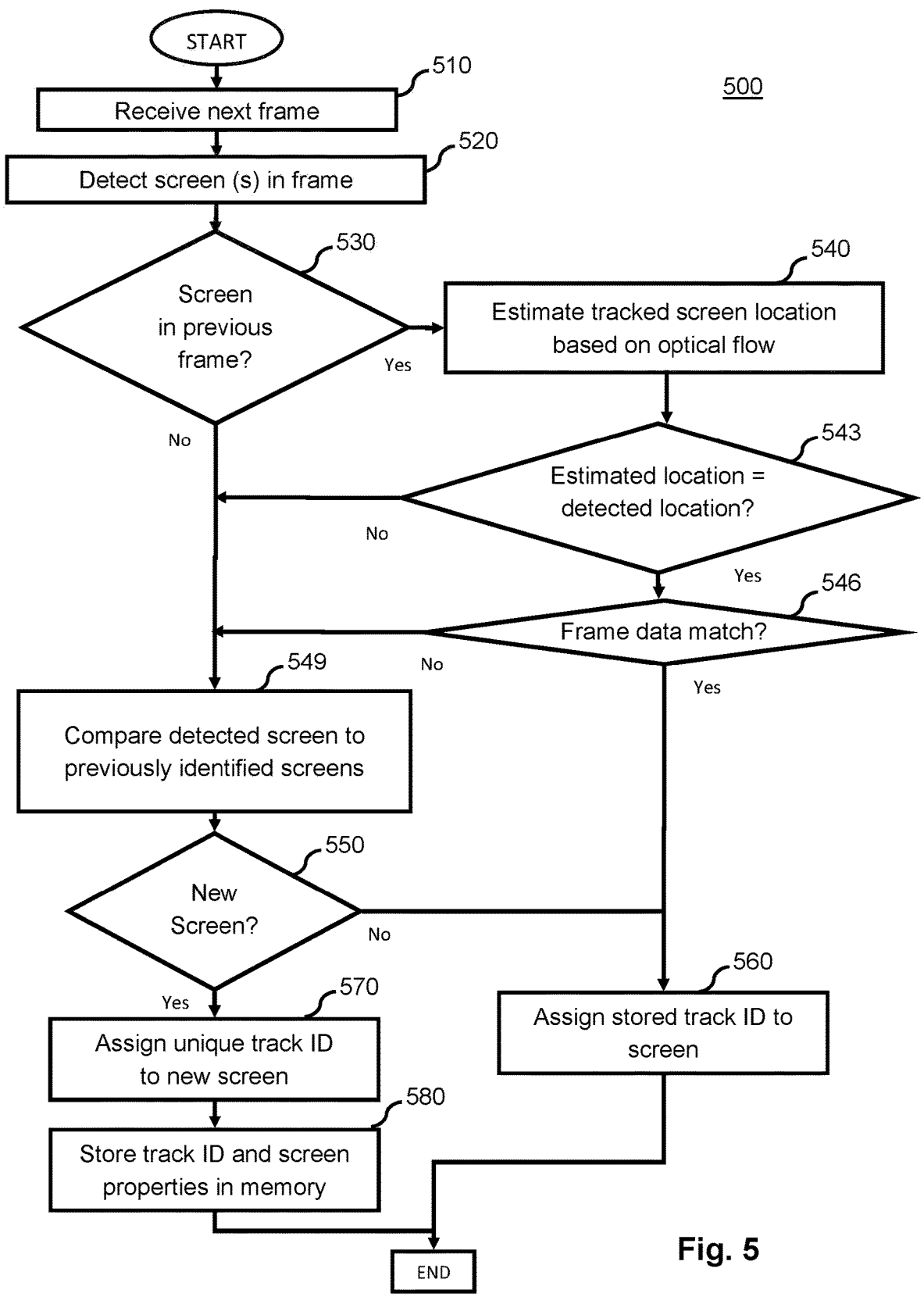
FIG. 5 is a diagram of an example method for detecting data for redaction across multiple frames of video data according to various aspects of the present disclosure.

As discussed above, recorded data may be analyzed to determine the location of light-emitting screens that may be redacted. Method 400 of FIG. 4 is an example implementation of a method for analyzing and redacting data to produce redacted data according to various aspects of the present disclosure. Method 500 of FIG. 5 is an example implementation of a method for detecting a light emitting screen among a sequence of frames according to various aspects of the present disclosure.

Method 400 may be performed by a redaction computing device. The redaction computing device may be configured to perform one or more functions for redacting data, including one or more functions as shown in FIG. 4 or FIG. 5. Such a device include be server 160, for example. One or more steps may be performed using a data store, such as data store 150 or an internal data store for the device. In other embodiments, the redaction computing device may include a computing device 170 or one or more of a server 160 and a computing device 170. The method may be performed by a processing circuit of the computing device. The processing circuit may be configured to execute instructions. Execution of the instructions may cause one or more of the processor circuit and the computing device to perform steps. The steps may include one or more steps discussed herein. The steps may include those shown at blocks in FIGS. 4-5. The instructions may be stored on a computer-readable, non-transitory medium. Execution of the instructions by a processing circuit may cause the processing circuit or a device that includes the processing circuit to perform one or more functions to redact a light-emitting screen in an image as discussed elsewhere herein.

As shown in FIG. 4, a computing device according to embodiments of the present in invention may receive 410 an image. Receiving an image may include receiving an instruction to detect light-emitting screen in recorded data that includes the image. Receiving the image may include receiving an indication of the recorded data to be processed. For example, receiving the data may include receiving a file name or other recorded data identifier and requesting recorded data associated with the identifier from a data store. In embodiments, receiving an image may include receiving video data previously recorded using an image sensor of a recording device and uploaded from the recording device. The recording device may be a body-worn camera configured to be worn by a law enforcement officer. Receiving the image may include requesting and/or receiving the image from a data store. Receiving the image may include receiving video data that includes the image, wherein the image is a frame of the video data. Receiving the image may include receiving an image previously captured by a receiving device and uploaded as part of a live-stream of video data from the recording device. Receiving the image may include receiving an image of a live-streamed video data from one or more of a server and a data store in communication with a recording device at which the live-streamed video data was captured. Receiving the image may include receive the image via an intermediate device, such as one or more of a dock, a data store, a memory, and another computing device. The received image may be uploaded via an intermediate device prior to being further received or uploaded by a redaction computing device.

In embodiments, receiving 410 an image may include receiving a redaction type to be performed. A redaction type may be associated with a type of object to be detected in recorded data. A type of object to be detected may include a light-emitting screen in embodiments according to various aspects of the present disclosure. A type of object to be detected may include one or more light-emitting screens, license plates, and faces of people in recorded data. A redaction computing device may apply different processing to recorded data in accordance with each redaction type, such as a trained, different machine learning model, detection engine, or trained neural network. Receiving 410 may include receiving a selected redaction type of a light-emitting screen, license plate, and face. In embodiments according to various aspects of the present disclosure, the receiving includes receiving a selected redaction type associated with a light-emitting screen. The received redaction type may be selected via a user interface or, in embodiments, may be selected by default by one or more computing devices according to various aspects of the present disclosure.

A received image may be a single image. It also may be a frame among a sequence of frames in video data. The image may include pixel values. The pixel values indicate how to display the image on an output screen, such as the monitor of computing device 170. Upon receipt 410, the pixel values may be in their original form as captured by a recording device. One or more light-emitting screens may be represented in the received image, depending on the objects present in the field of view of the camera at the time of recording.

Within the received image, one or more light-emitting screens are detected 420. The received image is processed to detect one or more light emitting screens. In embodiments, at least one of the detected light-emitting screens is a screen of a mobile data terminal mounted in a vehicle. In embodiments, the detected light-emitting screen is a screen of one of a mobile data terminal mounted in a vehicle and a mobile communications device. In embodiments, detecting the one or more light-emitting screens in each image of one or more images comprises detecting two or more light-emitting screens in a same image of the one or more images. Detection may include applying the image to an artificial neural network. The screens may be detected through the use of a deep learning network. The network may be a deep neural network. The network may be previously trained on training data. The training data may include training images. The training images may be separate from recorded data to which the neural network may be subsequently applied. The training images may be separate from recorded data to which the trained neural network may be subsequently applied, wherein the neural network is configured to detect one or more light-emitting screens in the recorded data, despite not having been previously applied to the recorded data. Detecting the light-emitting screen in each image of one or more images of video data may comprise applying the video data to a neural network previously trained on separate images each comprising one or more annotated light-emitting screens. The network is thus adapted to identify light-emitting screens in recorded data received as input. The predetermined, trained network may be stored in memory of the redaction computing device. The network may be accessible and executable on received recorded data by one or more processing circuits of the device. In embodiments, determining an image in which a light-emitting screen is detected may include detecting the light-emitting screen in the image.

In embodiments, a network may be tuned to recognize predetermined features within the received image data. The tuning may be imparted by the application of training data noted above. Collective identification of one or more such features may lead to a detected light-emitting screen within the received image. Detecting the light-emitting screen may comprise detecting one or more subsets of the pixels or pixel values with a predetermined feature. The subsets of pixels may be of different sizes, such as an 8 by 8 block of pixels and a 16 by 16 block of pixels. Features within other sizes of blocks, including non-square blocks of pixels, may be detected as well according to various aspects of the present invention.

One predetermined feature may be a brightness variance within a block of the pixels. A brightness variance may include a difference in brightness between a first pixel or set of pixels in the block and a second pixel or set of pixels in the block, the first and second pixel or pixels being different. The brightness variance may include a low brightness variance in the block of pixels, indicative of a region within the light-emitting screen in the image. The low brightness variance may be determined by a threshold, such that if a brightness difference does not exceed the threshold, the block of pixels is considered to include a low brightness variance. The brightness variance may also include a transition from a first, high brightness value to a second, low brightness value, an amount of the transition being greater than a predetermined threshold value and indicative of a border between a light-emitting screen and a non-light-emitting surface in the image.

A predetermined feature may also include a border between a light-emitting screen and a non-light-emitting bezel in a brightness variance within a block of the pixels. The border may be indicated by color values of the pixels. For example, a bezel may have a dark color, while a light-emitting screen may a lighter color such that pixels in recorded data include light colored pixels adjacent dark colored pixels. The light and dark colored pixels may be adjacent each other along a straight line in pixels of recorded data, wherein the line corresponds to the border between a light-emitting screen and a non-light-emitting bezel. In some embodiments, a border may be indicated by a difference in intensity values between two sets of adjacent pixels in the block of pixels. For example, a line of pixels with low intensity values adjacent a line of pixels with high or higher intensity values may alternately or additionally correspond to a border of a light emitting screen.

A predetermined feature may also include text detected within the optical information provided by the block of pixels. Step 420 may detect patterns of pixel values corresponding to text. Such patterns may include row and/or columns of patterns corresponding to text.

Another predetermined feature may be a rectangular shape within the block of pixels. In some embodiments, a rectangular shape may be a required detected feature for a detected screen. Many light-emitting screens of interest are rectangular in shape, which allows for such a feature to be indicative of a screen detected in step 420. The predetermined feature may also include diamond or skewed rectangle shape within the block of pixels. This allows for a screen that is rectangular in shape, yet not aligned with the optical axis of a recording device to yet be detected within recorded data. Rectangular shapes are shown, for example, in the example illustrations of FIG. 2-3.

The predetermined features may also include a relative position of an object. For example, MDT screens may be commonly included at lower right quadrants of an image or frame. Other screens, such as mobile communications device screens may also be provided in the lower half of an image based on a relative position of a recording device and a user's hands. Other predetermined features, including combinations of such features, may be detected in embodiments according to various aspects of the present disclosure, including or aside from those expressly discussed above.

A predetermined feature may also include detection of an object related to display comprising a light-emitting screen. For example, a steering wheel detected in an image may indicate that the images is captured inside a vehicle, where an MDT may be provided. As another example, detection of a hand of a user may indicate that a screen of a mobile communications device may be captured in the image, as a hand may be employed to orient the light-emitting screen toward the user and a camera mounted on the user. The related objects may include one or more predetermined objects. The related object may not itself include a display or light-emitting screen. In embodiments according to various aspects of the present disclosure, a predetermined feature may include an object related to one or more light-emitting screen that is detected in an image being processed.

As noted above, detection of a light-emitting screen in an image or frame may be based on one or more of a plurality of predetermined features in the image. This may include a first predetermined feature in a first block of the pixels and a second predetermined feature in a second block of the pixels, the first and second blocks of pixels being adjacent to each other within the image. The first predetermined feature and second predetermined feature may be different predetermined features. For example, a first block may be detected to include a feature of a border and a second block, adjacent to the first block, may include a feature of low brightness variance within the second block. Such different features may collectively indicate that a light-emitting screen is represented in the image and corresponding pixel values associated with the blocks. A feature may also span two such blocks. For example, a border feature may be detected in a first block, while a rectangular shape feature may be detected in a second block that includes the first block. This combination of features may also indicate the presence of a light-emitting screen in a corresponding set of pixel values.

Certain detected features may also be used to indicate that a block of pixels does not correspond to a light-emitting screen. For example, a block with a detected feature of a majority red color within a second block with a rectangular shape may indicate that the second block corresponds to a license plate rather than a light-emitting screen. Again, such features may be determined and generated with a neural network or other deep learning technique which has been previously trained to recognize such features.

Collectively, the identified features may be compared against decision criteria to determine whether a screen is positively identified in an image. This decision criteria may involve one or more weighted thresholds, though other criteria may be used, including those that are more complex. For example, as noted above, the predetermined criteria may involve a trained deep learning technique, such as a neural network, which may have predetermined decision-making criteria encoded therein. These criteria, along with the network as a whole, may be established, generated, and provided to the computing device in advance of being executed by the computing device and in advance of the image, frame, or video data being received by the computing device.

The predetermined features and decision criteria discussed above are merely examples and should not be construed as limiting. Embodiments according to various aspects of the present invention may detect a light-emitting screen in one or more manners that include or are independent of such features and criteria.

Detecting a light-emitting screen may include generating metadata pertaining to the detected light-emitting screen. The metadata may include one or more of a boundary, pixel location, and dimension. For example, the output of detection 420 may include one or more pixel locations along with corresponding bounding box dimensions. A pixel location may indicate an anchor point in a corresponding image or frame with which a bounding box is associated. A pixel location may be a reference pixel location. The bounding box dimensions may indicate the area of a corresponding image or frame that is determined to be associated with the detected screen. The bounding box dimensions may indicate an area of pixels in various manners, including a number or length of pixels and/or additional pixel locations. Collectively, the pixel location and bounding box indicates a set of pixels and their respective pixel locations within an image or frame that are associated with a detected light-emitting screen. In embodiments, output of the detection step 420 includes such pixel locations and bounding box dimensions. Other forms of output are also possible, including those that indicate a set of pixel values associated with a detected screen in other manners. Multiple sets of indicating information may be provided for a given image or frame, representing when multiple such screens are detected within the image or frame.

In embodiments, an output of detection may also include an indication of a type of a light-emitting screen detected in a frame. A type of a light-emitting screen may include a screen of one of a desktop monitor, a laptop, a tablet, an MDT, a cellular telephone, a television, and an in-car navigation screen. A type of screen may be subsequently displayed in order to provide additional context for a detected object. A type may also be used in subsequent processing. For example, certain types of screens may be selected for redaction by default, while other types of screens may not be selected by default for subsequent redaction.

In embodiments, output of a detection of a light-emitting screen may also include a value indicative of the accuracy of the detection. A value may include a confidence score. For example, metadata generated for a detected light-emitting screen may include a confidence score. A confidence score may indicate an accuracy of whether a region of pixels detected light-emitting screen to represent a light-emitting screen correctly represents a light-emitting screen that is present in original video data. A high value may indicate a high likelihood that a detected light-emitting screen is accurate. A low value may indicate a low likelihood that a detected light-emitting screen accurately corresponds with a light-emitting screen in an original frame or image. An error rate for detections with a low accuracy value may be greater than an error rate for detections with a high accuracy value. The value indicative of the accuracy of the detection may be generated in accordance with decision criteria applied to detect a light-emitting screen. In embodiments, a value indicative of the accuracy of the detection may alternately or additionally be applied at block 420 to determine whether a light-emitting screen is detected. The value may include an initial screening value or threshold. Potential light-emitting screens with values lower than an initial screening value may not be detected 420, much less available for display at block 450.

Once an image is processed and screen(s) are detected, the process may repeat 430 to receive additional images. Such images may correspond to frames of video data. While this repetition is shown as part of a series of steps in FIG. 4, steps in this figure may also be performed in parallel. For example, a first image may be undergo detection 420 at a same time a second image is being received 410. Moreover, a sequence of frames may be received 410 at a same time before being individually processed 420.

In embodiments according to various aspects of the present disclosure, blocks 410-430 may be performed independent of a user interface element at a separate computing device. For example, method 400 may start upon receipt of instructions at first computing device such as device 170. The instructions may correspond to a manual input received at computing device 170. The instructions may include an indication of a media file in which light-emitting screens should be detected. The instructions may also include an instruction to start detecting light-emitting screens in the indicated media file. The instructions may be received via an interface element presented at a local computing device. For example, instructions may be provided at computing device 170 via a user interface element comprising a window, browser, dedicated program interface, or other visual interface element displayed on computing device 170. The provided instructions may be provided to a redaction computing device, separate from the device on which the instructions were provided.

Based on the instructions, the redaction computing device may detect light-emitting screen in each of one or more frames in the indicated media file independent of further input received via the user interface element. The indicated media file may be processed automatically by the redaction computing device. For example, a user interface element may be closed. Execution of the user interface element may be terminated or otherwise stopped at the separate computing device. The separate computing device may be turned off. Yet, a redaction computing device may continue to detect one or more light-emitting screens in the indicated media file. Such an arrangement provides various benefits. For example, it enables the separate computing device to be used to perform other tasks while the light-emitting screens are detected. Resources of the separate computing device are not required to be reserved or otherwise preserved for detection of light-emitting screens. A user at the separate computing device may also walk away from the separate computing device or otherwise perform other tasks while waiting for a result of the detection. The detection of the light-emitting screens may be performed in the background at a redaction computing device until all images or frames of a media file have been detected and associated metadata has been generated. For example, the redaction computing device may store the generated metadata until a second instruction related to recorded data is received by the redaction computing device from a separate computing device, upon which the redaction computing device may transmit the stored metadata to the separate computing device. The generated metadata may be stored in a data store at the redaction computing device. In these embodiments, the second instruction may be received after an instruction to detect a light-emitting screen was previously received for the recorded data and the metadata may be generated and stored prior to receipt of the second instruction. The second instruction and the prior instruction to detect for the recorded data may be received from a same separate computing device or different separate computing devices. Upon restarting a user interface element of the separate computing device, an output of light-emitting screen detection 420 may available for subsequent review and processing.

As noted above, output of the detection step 420 may include indications of one or more pixel values and corresponding pixel locations of detected screens for each processed image. These indications may be associated with the original image and original file to formally identify 440 the pixel values associated with the detected screens. In embodiments, identifying 440 pixel values may include generating a mask for display for each light-emitting screen in each frame or image in which a light-emitting screen is detected 420. Identifying one or more light-emitting screens may include generating metadata that includes a mask for each detected light-emitting screen. The mask may be determined relative to a boundary or other metadata associated with a detected light-emitting screen. In embodiments, determining a mask associated a detected light-emitting screen for display may include generating the mask.

In embodiments, identifying 440 pixels associated with a light-emitting screen includes tracking a detected light-emitting screen between frames. Tracking may include one or more comparisons between a current frame and one or more previous frames in recorded video data. Tracking may include comparing a location of a detected light-emitting screen in a current frame with one or more second locations of each of one or more light-emitting screens a sequential frame immediately prior to the current frame. Tracking may include determining a motion vector associated with one or more of a current or previous frame and predicting a location of one or more light-emitting screens in accordance with the determined motion vector. Tracking may include comparing one or more predicted locations of respective predicted light-emitting screens and a detected location of a light-emitting screen. Tracking may include comparing one or more previously detected locations of previously detected light-emitting screens and a detected location of a currently detected light-emitting screen. Tracking may include comparing one or more pixel values of a detected light-emitting screen in a current frame with one or more pixel values associated with each of one or more light-emitting screens a sequential frame immediately prior to the current frame. Tracking may include comparing a location or one or more pixel values of a detected light-emitting screen in a current frame with one or more locations or one or more pixel values of each of one or more detected light-emitting screens in previous frames in same recorded data, wherein the previous frames do not immediately precede the current frame. Tracking may include tracking a same light-emitting screen between two frames with one or more intervening frames between the two frames in which the same light-emitting screen has not been detected. Tracking may include determining a current detected light-emitting screen to match a previously detected light-emitting screen in accordance with one or more comparison performed between the current detected light-emitting screen and the previously detected light-emitting screen, wherein each comparison is determined to have a difference less than threshold difference. For example, tracking may determine a same light-emitting screen is detected in each of two frames when a difference between pixel values or locations of light-emitting screens detected in each frame is less than a threshold difference.

In embodiments, identifying 440 pixels associated with a light-emitting screen includes assigning an identifier to a detected light-emitting screen. The identifier may be a track identifier that uniquely identifies a detected light-emitting screen among other detected light-emitting screens. When a detected light-emitting screen does not match a previously detected light-emitting screen or is not tracked between frames, a new identifier may be assigned. When a detected light-emitting screen is tracked between frames, a same identifier may be assigned to the light-emitting screen detected in each of the frames. The assigned identifier may be used to associate a mask of a current frame with one or more masks of previously detected light-emitting screens. Each mask in a mask segment may correspond to a detected light-emitting screen associated with a same assigned identifier. Assigning an identifier across multiple frames may include generating a continuous mask segment across the multiple frames wherein a single detected light-emitting screen in each of the multiple frames is assigned the same identifier. For example, a same identifier may be assigned to the detected screen 375 of MDT 370 in each of frames 325 and 335, wherein each frame between frame 325 and 335 includes the detected screen 375 in the example of FIG. 3. In such embodiments, a continuous mask segment for screen 375 may include masks 390 for each of frames 325 and 335. In embodiments, screen 375 in frame 335 and screen 375 in frame 355 may be assigned same or different identifiers and mask 390 for each frame 335, 355 may be associated with same or different mask segments depending on one or more comparisons between the detected screen 375 in each of frames 335 and 355. Assigning the identifier may include storing the assigned identifier as metadata for a frame.

While shown as separate steps of detection 420 and identifying 440, such functions may be combined in a single step according to various aspects of the present disclosure. For example, detection of a light-emitting screen may include generation of metadata for the light-emitting screen that includes both a boundary and a mask.

Once a bounding box, boundary, mask, or other indicative information is associated with original pixel values in an image, this collective set of information may be displayed 450 to a user. Displaying 450 may include providing generated metadata from a first computing device, such as a redaction computing device, for display on a second computing device, such as a client computing device. For example, indications of the pixels may be displayed on a monitor or display of computing device 170. The indications may include metadata generated and provided by a redaction computing device, which may comprise one or more of a server 160 and data store 170. At step 450, a redaction computing device may transmit a mask or other indication associated with a detected light-emitting screen for display. These indications may be displayed in a manner that allows the pixel values associated with the detected screens to be visible in the monitor. For example, masks corresponding to bounding boxes may be added to the original images or frames such as shown in FIG. 3. The masks may be overlaid on the original images. Based on the display of a mask prior to redaction, a user may confirm whether a detected light-emitting screen correctly represents a light-emitting screen captured in original video or image data and/or whether a specific detected light-emitting screen should be redacted.

In embodiments, providing metadata regarding a detected light-emitting screen for display may include providing a mask segment. The mask segment may include a mask in each of a plurality of images for a same detected light-emitting screen. The mask segment may be updated on a frame-by-frame basis with each provided metadata for each processed image or frame. In embodiments, the mask segment may be displayed 450 parallel to a seek bar for recorded data on a user interface, enabling a number or range of frames in which a same light-emitting screen was detected to be visually identified to a user. The mask segment may be displayed in a segment timeline parallel to the seek bar, which may provide an indication of which frames selectable via the seek bar for the recorded data may also include a mask for a given mask segment. An end of a mask segment may be extended for each image or frame in which a same light-emitting screen is detected. As displayed, a mask segment may increase in size along the segment timeline parallel to the seek bar while one or more additional masks for a same detected light-emitting screen are generated. Metadata associated with a first part of the mask segment may be provided for display prior to and during processing of recorded data to generate metadata associated with a second part of the mask segment. A mask segment may provide an indication of a duration of presence of a detected light-emitting screen in recorded data, while also providing indication of ongoing processing of recorded data while a first image of the recorded data is output on a display of a computing device. Each different light-emitting screen in recorded data may be associated with a different mask segment. Providing metadata for a display may include providing metadata for updating each mask segment associated with a same light-emitting screen for which metadata was previously provided for display 450.

In embodiments, display 450 comprises playback of recorded data with a mask displayed on each detected light-emitting screen. For example, frame 325 may be displayed 450 on a display of a computing device 170. Frame 325, as displayed, may include mask 390 around a screen 375 of MDT 370. A type of the detected light-emitting screen may also be displayed. For example, the text "MDT" may be displayed adjacent mask 390. A checkbox or other user interface element may also be displayed adjacent mask 390, enabling mask 390 to be selected. Display at block 450 may include display of each frame of a media file that in which one or more light-emitting screens has been detected 420.

Display 450 may be executed on a frame-by-frame basis for a media file. Such display 450 enables one or masks to be previewed. Metadata associated with each detected light-emitting screen may be transmitted from a redaction computing device for display on the frame-by-frame basis. Display 450 on a frame-by-frame basis may also enable any frames in which any light-emitting screens are not detected 420 to be identified by a user. A frame-by-frame display 450 also enables other, non-light-emitting screen objects in a media file to be identified for potential redaction.

In embodiments, metadata may be provided for display 450 concurrently while metadata is also being detected or identified for a same recorded data. For example, a light-emitting screen may be detected at a same time as a mask for a second light-emitting screen is transmitted for display. A mask for a third image may be identified or otherwise generated while another mask for a second image is displayed or transmitted for display. Each of the images in this example may be associated with a same recorded data, such as different frames from a same recorded video data. Detecting a light-emitting screen in each image of the one or more images may comprise concurrently providing an indication of the identified subset of pixels in a first image of the one or more images for display and identifying the subset of pixels in a second image of the one or more images.

Such parallel processing provides various advantages, including an ability to receive further input from a user regarding a detected and displayed light-emitting screen in an image, even while one or more other images of a same recorded data are still being processed. Concurrent processing, such as between a detection or identification step and a providing metadata for display step, may also provide rapid confirmation that a detection process is being performed as instructed by a redaction computing device.

In embodiments, display 450 of a detected light-emitting screen or providing metadata for the display may be based on a value indicative of the accuracy of the detection. For example, the value may be compared to a threshold and metadata associated with a detected light-emitting screen may only be provided or displayed if the value is greater than the threshold. A mask for the detected light-emitting screen may be selectively provided or displayed 450 based on the value indicative of accuracy of the detection.

In embodiments, a threshold or other basis on which metadata detected light-emitting screen is displayed 450 may be adjustable. For example, an instruction may be received to display detected light-emitting screens that have a value indicative of the accuracy greater than an adjustable value. An instruction may be received to adjust the value higher or lower. A higher value may decrease a number of detected light-emitting screens being displayed 450. A higher value may also increase an accuracy of detected light-emitting screens that are displayed 450. Similarly, a lower value may increase a number of detected light-emitting screens being displayed 450, while also decreasing an accuracy of the increased number of detected light-emitting screens that are displayed 450. As such, a tradeoff may exist between a first higher value by which fewer, more likely accurately detected light-emitting screens are displayed and a second lower value by which more, but also more likely inaccurately detected light-emitting screens are displayed at block 450. The first value may cause masks for one or more light-emitting screens to be not displayed, while also decreasing a number of falsely detected light-emitting screens that may need corrected, reviewed, or otherwise addressed. The second value may cause an increased number of masks to be displayed, while also increasing a need to review, correct, or otherwise address falsely detected light-emitting screens. In embodiments, a second, lower value may be employed by default at 450 to determine whether a detected light-emitting screen is displayed 450.

After display, an instruction to redact a detected light-emitting screen may be received 460. The instruction to redact may include an indication of an associated detected light-emitting screen to be redacted. The instruction to redact may include a selection. The selection may include a selection of a mask segment associated with a same light emitting screen across one or more of the one or more images. The mask segment may be a same single mask segment associated with a plurality of masks for the same detected light-emitting screen across a plurality of images. A single selection of the mask segment may enable the plurality of masks to be selected, thus efficiently enabling selection of masks across a plurality of frames or images in recorded video data. For example, after providing metadata indicative of a detected light-emitting screen, a redaction computing device may then receive 460 instructions on whether pixel values associated with the identified screen(s) should be redacted. The instruction may be transmitted to the redaction computing device. This instruction may be received via a keyboard or other input device at a computing device such as device 170. The instruction may be provided by selecting an identified area on a monitor or display.

For example, a button or other user interface element on user interface of a display may be selected to redact all detected light-emitting screens in a media file. The instruction may indicate that all screens in a file should be selected for redaction, regardless of a type of screen, content of a screen, or other variable aspect of a potential light-emitting screen detected in a media file. Alternately or additionally, the instruction may be received at an input device and associated with a specific detected screen. The instruction may be received relative to a generated mask. For example, selection of a checkbox associated with mask 390 may be received 460, indicating that screen 375 of MDT 370 should be redacted.

In embodiments, an association between an instruction to redact and a light-emitting screen to be redacted may involve storing a redact flag, status, or other indicator with a track identifier (ID) that uniquely identifies a screen to be redacted. For example, an instruction may be received to redact screen 375 which may be associated with a first track ID. Screen 375 may be associated with the first track ID in each frame in which it is detected, including frame 335. Such an indicator may be used by the server or other redaction computing device to apply or not apply a redaction filter to the corresponding set of pixel values. For example, a second detected light-emitting screen may be provided for display 450, but a second track ID associated with the second detected light-emitting screen may not be associated with a redact indicator, indicating that the second detected light-emitting screen should not be redacted.

An instruction to redact may be provided relative to a single frame or image. For example, the instruction to redact screen 375 via mask 390 may be provided at frame 325 in the example of FIG. 3 when frame 325 is displayed on a user interface. Yet, using the track ID, a same detected screen may be redacted in subsequent or other frames, aside from a first frame that may have been displayed on a computing device when the instruction was received. For example, screen 375 may be marked for redaction in frame 335 based on the instruction received relative to screen 375 and mask 390 at frame 325 in the example of FIG. 3. Use of the track ID allows the redaction instruction to be automatically applied and enforced across multiple frames. The frames to which this redaction instruction may be applied may include those that have not been displayed to the user, nor necessarily are displayed on a user interface device to a user before the redaction is applied to the frame. The use of a single track ID and a single redaction instruction to enforce redaction across multiple frames simplifies the application of redaction 470. This arrangement also improves the efficiency of the process, decreasing the number of instructions that may otherwise be necessary to redact a same screen across multiple frames. The use of track IDs also allows redaction 470 to be selectively applied to detected screens. For example, a redact status, flag, or other affirmative indicator may be set to incur redaction for the MDT screen in FIG. 3, but not the mobile communications device screen in the corresponding frames of FIG. 3. The instruction may be entered at a device remote from the redaction computing device, such as computing device 170 which is remotely located across a network from server 160. The association between the redaction instruction and the track ID may be performed at either the local computing device 170 or the remote computing device 160.

In embodiments, an instruction to redact may include a selection of a mask segment. The mask segment may include a mask in each of a plurality of images for a same detected light-emitting screen. The mask segment may be associated with a track ID. The selection of the mask segment may include selection of a track ID associated with the mask segment.

Default instructions or redaction indicators may also be provided in the absence of subsequent input with such instructions. For example, all detected light-emitting screens may be selected for redaction by default upon display 450. A default instruction or redaction indicator may include a default selection. A default selection may be previously provided to a computing device with generated metadata, wherein receiving the default selection may include receiving the same default selection after the default selection was previously provided. In embodiments, a default selection may be provided or returned to a redaction computing device in an absence of a second, non-default selection being received. The default selection may be first provided or transmitted from a redaction computing device. The same default selection may then be received by or provided back to the redaction computing device for further processing. Receiving instruction 460 may comprise receiving instructions to deselect one or more light-emitting screens.

In embodiments, receiving an instruction to redact may include receiving a selection comprising an edit of a mask. The selection comprising the edit may be received at a first computing device and transmitted to a second computing device. The edit may adjust one or more of area, location, size, or shape of a mask. The edit may be associated with a single image. The edit may be associated with a plurality of images, including one or more frames. For example, an edit may be associated with a mask related to a sequences of images over a period of time. The period of time may include all images in which a light-emitting screen associated with the mask is detected. The period of time may include less than all images in which a light-emitting screen associated with the mask is detected. The edit may be associated with a track ID, causing enabling a same adjustment to be applied to each mask in recorded data associated with the track ID. The selection comprising the edit of the mask may be received over a network at a redaction computing device.

A detected light-emitting screen may also be selected or not selected by default based on a type of the detected light-emitting screen. For example, a type of detected light-emitting screen corresponding to a cellular telephone or a MDT may be selected by default. Another type of light-emitting screen, corresponding to a television may not be selected by default according to various aspects of the present disclosure. One or more selections received as part of an instruction to redact may cause a type of light-emitting screen to be selected or deselected for subsequent redaction.

In embodiments, detected light-emitting screens may not be selected by default and a lower value indicative of accuracy may be applied to determine whether a detected light-emitting screen is displayed. Such an arrangement may increase a number of light-emitting screens that may need to be selected in order for the light-emitting screens to be redacted. However, such an arrangement may cause no additional instruction to be received 460 for errors in detection 420 in order for accurate redaction to be subsequently applied to a media file. Rather, instructions received 460 may confirm accuracy of detection 420. Such an arrangement may still save time for a user compared to redacting light-emitting screens without a redaction tool as discussed herein, but prevent the user from having to correct errors that did would not exist absent the application of the redaction tool. In embodiments, such an arrangement may increase an accuracy of subsequent redaction of a media file by ensuring that each redaction is manually confirmed and corresponding instruction to redact is positively received 460.

Based on received instruction(s), which may include one or more associated track ID(s), a redaction computing device may apply 470 a redaction filter to pixel values associated with the track IDs and corresponding detected screens. The redaction may involve application of a blur filter to pixel values within an area of pixels indicated by a pixel location and bounding box dimensions. The redaction may involve application of a blur filter to pixel values within an area of pixels associated with a mask. An area of a mask may include an area of a boundary of a detected light-emitting screen, such as bounding box. The blur filter may modify one or more pixel values to which it is applied. The modification may include increasing or decreasing one, all, or some of component intensity values in the pixel values to which the filter is applied. The modifications may decrease a difference in pixel value relative to a corresponding value of one or more pixel values at adjacent locations in the image. When applied to pixel values in an area, the result of the application of the redaction filter may include a decrease in the optical information represented by the pixels to which the filter is applied. The pixel values in this area may be made more coherent and less distinct. These pixels in the image are thus redacted. The modified pixel values are censored or obfuscated relative to their values in an image originally received from a recording device. Information provided via the pixels prior to the application of the redaction filter may be obfuscated by the application of the blur filter. Pixel values at locations outside an area to which the redaction filter is applied may retain their original values at this step 470 in the process. In embodiments, extracting redacted media comprises applying a redaction filter to one or more images in which an object is detected.

In embodiments, applying a redaction filter may include redacting pixel values associated with a plurality of generated metadata. The plurality of metadata may include metadata associated with a plurality of masks. The plurality of metadata may include metadata associated with a mask segment. In embodiments, a redaction computing device may automatically apply the redaction filter to each mask in a plurality of images in accordance with a single instruction to redact. The resulting redaction, while separate from the detection of light-emitting screens and the generation of the metadata, enables the light-emitting screens to be selectively and efficiently be obfuscated upon receipt of the instruction to redact. In embodiments, detecting the light-emitting screen in the first image comprises generating a mask associated with the detected light-emitting screen and transmitting the mask to a remote computing device, while redacting the first image comprises receiving a selection associated with the transmitted mask from the remote computing device and obfuscating the first image in accordance with the received selection.

Upon application of a redaction filter to each frame or image in a media file, a redacted file comprising each redacted frame or image may be generated 480. A light-emitting screen may be selectively redacted in each frame of the generated media file. Generating the file comprising the redacted images may include combining redacted images from recorded data in which a light-emitting screen has been redacted wither other images from the recorded data in which a light-emitting screen has not be redacted. Generating one or more redacted images may include storing a redacted media file with the redacted images in at least one memory. Generating one or more redacted images may include storing a redacted media file with the redacted images in a database. Generating one or more frames or images may also include transmitting the redacted data to a computing device. Generating one or more redacted images may include providing the one or more redacted images for display. Each redacted image may be provided for display on a user interface on a display of a computing device. For example, computing device 170 may receive a copy of redacted data from a redaction computing device upon generation 480 of the redacted data. In embodiments, redacted data may be stored separately from original, corresponding recorded data which may be preserved for various purposes, including evidentiary purposes in a law enforcement environment.

Embodiments according to various aspects of the present disclosure may particularly benefit the processing and redaction of screens in frames of video. An example method 500 for detecting a light-emitting screen in video data is shown in FIG. 5. One or more steps of method 500 may correspond to one or more steps included in steps 410-440 illustrated in FIG. 4. Embodiments of the invention may include execution of one or more steps shown in FIG. 5. Such steps may be implemented on a redaction computing device, such as server 160 or a redaction computing system involving one or more devices from FIG. 1.

Method 500 may involve receipt of a next frame 510. Receipt 510 may correspond to a receipt of an image 410 in the example embodiment of FIG. 4. As shown in FIG. 4, this receipt of a next frame may be repeated 430.

After receipt 510, one or more light emitting screens may be detected 520. The detection 520 may be based on pixel values of the received next received frame. The screens may be detected based on one or more features as discussed above with respect to FIG. 4. Such screens may be detected by applying one or more of a deep learning network and a redaction engine to the received frame. The detection 520 may be performed anew for each received frame. For example, the neural network of other processing technique may be applied to each frame without additional information, aside from the image data itself. The process 520 of screen detection may be performed independent of any results of any previous processing results. In other embodiments, detection 520 may be based in part on information from and/or generated based on one or more adjacent frames to a received frame in video data.

As part of the processing of sequences of frames, a screen may be tracked across multiple frames. Tracking may include identifying a location of the screen in each of two or more images. In embodiments, detecting a light-emitting screen comprises tracking a same light-emitting screen between a first image of the one or more images and a second image of the one or more images. Such tracking increases the chances that a screen will be identified relative to one or more previously detected screens. Tracking a light-emitting screen also permits a same track ID to be applied to a same screen across multiple frames.

At 530, a determination is made as to whether a screen was detected in a frame prior to a frame currently being processed, wherein the frame currently being processed corresponds to the next frame received at block 510. When a screen was detected in the prior frame, a position is estimated 540 for each such screen from the prior frame based on motion data in the current frame and one or more preceding or subsequent frames relative to the current frame. The motion may be estimated by calculating an optical flow of pixel values in the current frame and other frames. This calculation may be performed by applying the pixel values from the different frames to an optical flow calculator. The calculator may include one or more circuits, programmed or otherwise configured to generate motion vectors or other motion-related information for a plurality of locations, including a pixel location associated with the screen from one or more previous frames. In embodiments, a processor or processing circuit may execute instructions that cause the processor or processing circuit to perform the functions of the calculator. Using the motion information from the optical flow calculator, an estimated pixel location associated with the previous pixel location for a previously detected screen may be estimated. A new bounding box or other area of pixel locations may also be estimated for the previously detected screen based on the previous bounding box information and the estimated optical motion.

The presence of a tracked screen in a current frame may be validated in various manners based in this estimated information. For example, an estimated pixel location for the tracked screen may be compared 543 to one or more locations of one or more light-emitting screens detected at step 520. If a detected pixel location has been detected with a threshold pixel-based distance from an estimated pixel location, the estimated screen location can be considered valid.

The optical information within the estimated bounding box may also be compared 546 to optical information in a bounding box of the previous frame. The comparison may be based on comparisons between pixel values between the two sets of bounding boxes. It may also or alternately involve comparison of one or more features or other descriptors respectively extracted as part of the comparison 546 from each of the sets of pixel values in the bounding boxes. Such a comparison may involve application of one or more computer vision processing techniques, selected to score a similarity between the two sets of pixel values. If a resulting score is above a predetermined threshold, a match may be considered to exist based on the optical information presented within the two sets of pixel values.

When validation steps 543,546 are positive, a same light-emitting screen may be considered to be present in the current frame as in the previous frame. In this context, a track ID associated 560 with a set of pixel location and bounding box information may also be associated with the detected or estimated pixel location and bounding box information on which the validation step(s) for the current frame were executed. At block 560, the track ID of the light-emitting screen from the previous frame may also be assigned to the detected light-emitting screen of the current frame. The assignment of a same track ID may enable a mask associated with a current frame to be associated with a mask and mask segment for a same light-emitting screen in one or more previous frames of recorded data.

For detected screens without corresponding tracked information from a previous frame, processing may continue at block 549. At block 549, a detected screen of a current frame may be compared to all previously detected screens. Such comparison may be similar to the comparison performed at 546. However, the comparison may be performed among all previously detected screens in video data for a file, not just a screen detected in a previous frame. In embodiments, this block may involve comparing 549 the pixel values associated with each previously detected screen to each set of pixel values for a screen detected at 520. For example, pixel values of a detected first light-emitting screen may be compared with pixel values of one or more second light-emitting screens, even though the one or more second light-emitting screen may not be detected in a frame prior to the frame in which the first light-emitting screen is detected. This arrangement allows for the reidentification of a same screen, even if it is not present in an immediately preceding frame. A same screen may not be present in numerous preceding frames, yet still be reidentified at step 549. When pixel values of a current detected light-emitting screen matches pixel values of a previously detected light-emitting screen at block 549, a same, previous, and not new screen is detected. When pixel values of two detected light-emitting screens do not match pixel values of a previously detected light-emitting screen at block 549, a new light-emitting screen is detected.

When a current detected screen is not new 550 in accordance with the comparison 549, a previously determined track ID may be associated 560 with the current detected screen. The previously determined track ID may be the track ID of a previous detected screen determined to match a current detected screen at block 550 in accordance with the comparison at block 549. If a match for a current detected screen is not made 550, then a new, previously unassigned track ID may be associated 570 with the current detected screen. This association, including the track ID and visual features of the current detected screen may be stored 580 together in memory. The visual features, in some embodiments, may include the pixel values within the bounding box for the current detected screen. The stored visual features or pixel values and the assigned track ID may be locatable for subsequent use at blocks of method 500, such as blocks 530, where a newly detected current frame may result in an attempt at tracking 540 this screen in a subsequent frame. Storage 580 of properties of a currently detected screen may also include one or more pixel values associated with the screen, which may be used in processing such as at blocks 546 or 549.

While not shown in FIG. 5, certain of the steps may be repeated for untracked frames detected 520 in a current frame. For example, steps starting at 543 may be repeated for each detected frame from step 520 for which a corresponding tracked frame was not identified. A current frame with first and second screens detected 520 may be processed by applying steps starting at step 543 to each of the first and second screens. For example, each of a position of the first screen and second screen in this example current frame may be compared 543 to one or more estimated locations of one or more screens from a previous frame. In this context, the second frame 235 in FIG. 2 may involve assigning a track ID to the mobile communications device 280 via step 543, as the position of device 380 may not match a location while the MDT screen in the second frame 235 may be assigned (or reassigned) a track ID via steps starting at 540.

In embodiments, one or more blocks of method 500 may be performed in a different order, including in parallel, relative to an example order as illustrated in FIG. 5. For example, a comparison at block 543 may be performed for a first detected light-emitting screen in a current frame at a same time as a comparison of pixel values at block 546 for a second detected light-emitting screen in the current frame. Alternate orders, including those opposite or non-sequential relative to the blocks shown in FIG. 5 may be employed in embodiments according to various aspects of the present disclosure.

In embodiments, one or more blocks of methods 400 and 500 may be performed automatically. For example, a second function or block may be performed by a computing device without or independent of user input, if any, received after execution of a first function or block. Such automatic processing may expedite one or more of detection and redaction of light-emitting screens or other objects. Such automatic processing may also enable one or more functions to performed concurrently, thus maximizing use of available resources for redacting recorded data.

Figure 6:
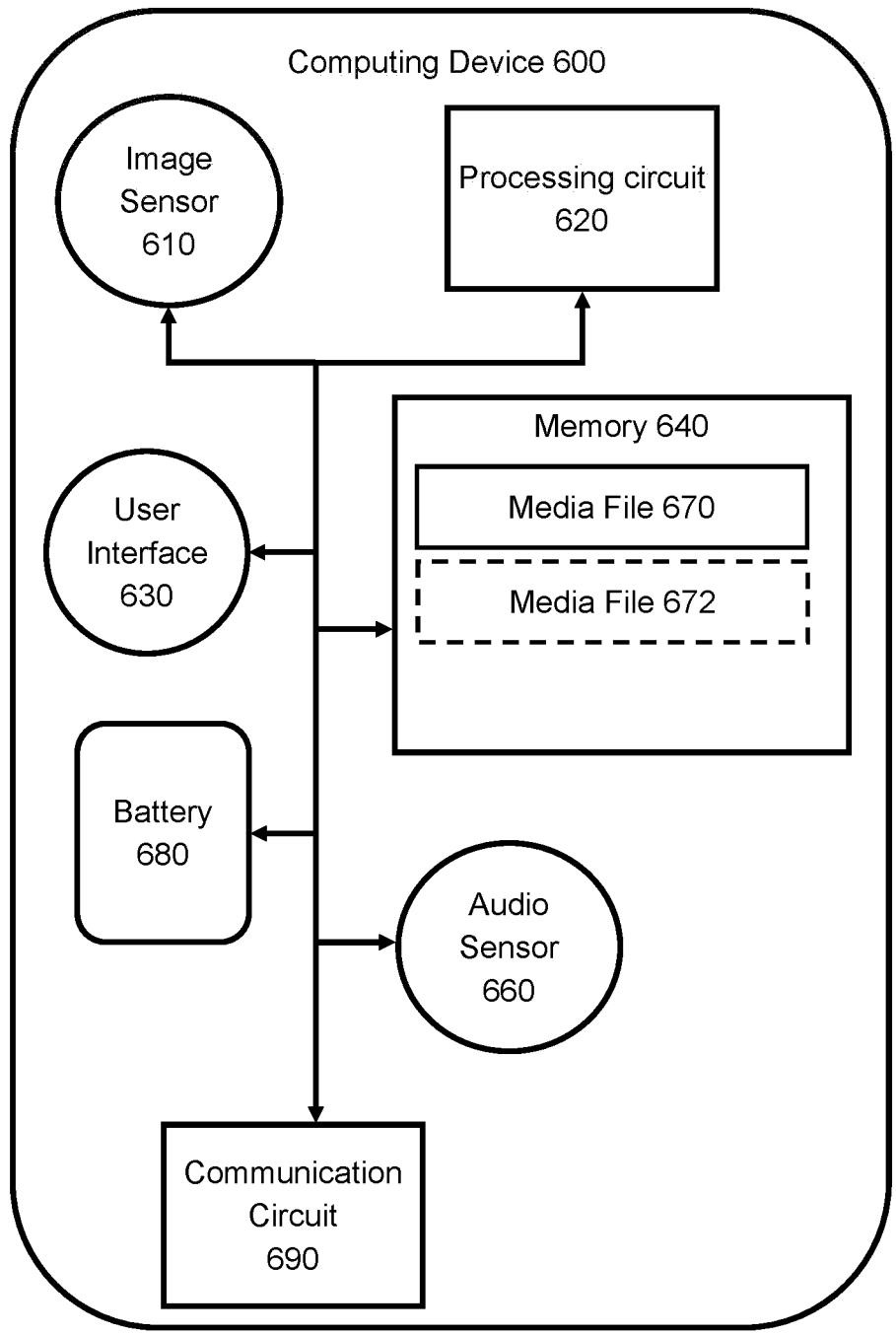
FIG. 6 is a block diagram of an example implementation of a computing device according to various aspects of the present disclosure.

Device 600 of FIG. 6 is a block diagram of an example implementation of a computing device according to various aspects of the present disclosure. In embodiments, the device may include a recording device. For example, the device 600 may correspond to camera 110. A mobile communications device, mobile communications device 125, may include one or more of the components of device 600 in embodiments according to various aspects of the present disclosure. Recording device 600 includes processing circuit 620, memory 640, user interface 630, power supply 680, image sensor 610, audio sensor 660, and communication circuit 690. Processing circuit 620 may include one or more processing circuits, one or more of which may be graphical processing units. Memory 640 may store one or more media files 670,672. A media file 670 may include recorded video data. For example, media file 670 may store a recorded video data such as shown in FIG. 2. Image sensor 610 detects light in a field of view and converts this optical signal into image data. In embodiments, image sensor 610 may include a video sensor, configured to light in a field of view and converts this optical signal into video data that includes a sequence of images. Audio sensor 660 detects sound. Communication circuit 690 transmits and receives data via a communication link. The communication link to which circuit 690 is communicatively coupled made include one or more of wired communication link and a wireless communication link. In embodiments, the processing circuit 620 may upload one or more recorded data, such as media file 670, via the communication circuit 690. The recorded data may be uploaded to a remote data store via the communication circuit 690.

A processing circuit includes any circuitry and/or electrical or electronic subsystem for performing a function. A processor circuit may include circuitry that performs (e.g., executes) a stored program. A processing circuit may execute one or more stored programs at the same time (e.g., in parallel).

A processing circuit may include a digital signal processor, a microcontroller, a microprocessor, an application specific integrated circuit, a programmable logic device, logic circuitry, state machines, MEMS devices, signal conditioning circuitry, communication circuitry, a conventional computer, a conventional radio, a network appliance, data busses, address busses, and/or a combination thereof in any quantity suitable for performing a function and/or executing one or more stored programs.

A processing circuit may further include conventional passive electronic devices (e.g., resistors, capacitors, inductors) and/or active electronic devices (e.g., op amps, comparators, analog-to-digital converters, digital-to-analog converters, programmable logic). A processing circuit may include conventional data buses, output ports, input ports, timers, memory, and arithmetic units.

A processing circuit may provide and/or receive electrical signals whether digital and/or analog in form. A processing circuit may provide and/or receive digital information via a conventional bus using any conventional protocol. A processing circuit may receive information, manipulate the received information, and provide the manipulated information. A processing circuit may store information and retrieve stored information. Information received, stored, and/or manipulated by the processing circuit may be used to perform a function and/or to perform a stored program.

A processing circuit may control the operation and/or function of other circuits and/or components of a system. A processing circuit may receive data from other circuits and/or components of a system. A processing circuit may receive status information from and/or regarding the operation of other components of a system. A processing circuit may perform one or more operations, perform one or more calculations, provide commands (e.g., instructions, signals) to one or more other components responsive to data and/or status information. A command provided to a component may instruct the component to start operation, continue operation, alter operation, suspend operation, and/or cease operation. Commands and/or status may be communicated between a processing circuit and other circuits and/or components via any type of bus including any type of conventional data/address bus.

A memory stores information. A memory provides previously stored information. A memory may provide previously stored information responsive to a request for information. A memory may store information in any conventional format. A memory may store electronic digital information. A memory may provide stored data as digital information.

A memory includes any semiconductor, magnetic, optical technology, or combination thereof for storing information. A memory may receive information from a processing circuit for storage. A processing circuit may provide a memory a request for previously stored information. Responsive to the request the memory may provide stored information to a processing circuit.

A memory may include any circuitry for storing program instructions and/or data. Storage may be organized in any conventional manner (e.g., program code, buffer, circular buffer). Memory may be incorporated in and/or accessible by a transmitter, a receiver, a transceiver, a sensor, a controller, and a processing circuit (e.g., processors, sequential logic).

A memory may perform the functions of a data store and/or a computer-readable medium. In embodiments, the memory may be a non-transitory medium.

A user interface provides an interface between a user and an electronic device. A user interface enables communication between a user and an electronic device. A user interface enables a human user to interact with an electronic device. A user may control, at least in part, an electronic device via the user interface. A user may provide information and/or commands to an electronic device via a user interface. A user may receive information and/or responses from the electronic device via the user interface.

A user interface may include one or more controls (e.g., switches, buttons, touch screen) that permit a user to interact and/or communicate with a device to control (e.g., influence) the operation (e.g., functions) of the device.

A user interface may provide information to a user. A user may receive visual, haptic (e.g., tactile, kinesthetic), and/or audible information from a user interface. A user may receive visual information via devices (e.g., indictors) that visually display information (e.g., LCDs, LEDs, light sources, graphical and/or textual display, display, monitor, touchscreen). A user may receive audible information via devices that provide an audible sound (e.g., speaker, buzzer). A user may receive tactile information via devices that vibrate, move, and/or change resistance against a user's finger as it is pressed. A user interface may include a communication circuit for transmitting information to an electronic device for presentation to a user. For example, a user interface may wirelessly transmit information to a smart phone for presentation to a user.

A user interface may include voice-to-text or voice-to-instructions converters so that a user may interact with the user interface verbally (e.g., by voice).

A power supply provides power (e.g., energy). A power supply may provide electrical power. Providing electrical power may include providing a current at a voltage. Electrical power from a power supply may be provided as a direct current ("DC"). Electrical power from a power supply may be provided as an alternating current ("AC"). A power supply may include a battery. A power supply may provide energy for performing the functions of a device. A power supply may provide energy for operating the electronic and/or electrical components (e.g., parts) of a device.

The energy of a power supply may be renewable or exhaustible. The energy from a power supply may be converted to another form (e.g., voltage, current, magnetic) to another form to perform the functions of a device.

An image sensor detects light. An image sensor detects light in a field of view. An image sensor detects light to capture an image with in the field of view. In embodiments, an image sensor may include a video sensor configured to may capture an image or sequence of images. An image sensor may include any conventional device for capturing an image or a sequence of images. An image sensor may include a semiconductor device such as charged coupled device (e.g., CCD).

An image sensor may convert detected light into numerical values that represent the image captured by the image sensor. The numerical values may be provided as analog and/or digital values. The numerical values may be stored in a memory. The numerical values may include pixel values. The pixel values may each include a respective set of component values associated with a received pixel and/or a display pixel. Storing an image in a memory records the image. A processing circuit may cooperate to transfer the captured images from an image sensor to a memory for storing.

An audio sensor detects sound. An audio sensor detects sound in the area of the audio sensor. An audio sensor detects sound to capture sounds in the area. An audio sensor may capture sounds that occur during a period of time. An audio sensor may include any conventional device for capturing sound, such as a microphone.

An audio sensor may convert detected sound into numerical values that represent the sound captured by the audio sensor. The numerical values may be provided as analog and/or digital values. The numerical values may be stored in a memory. Storing a sound in a memory records the sound. A processing circuit may cooperate to transfer the captured sounds from an audio sensor to a memory for storing.

Capturing and storing detected sounds may be coordinated with capturing and storing detected images so that the occurrence of the sound corresponds to (e.g., is synchronized to) the appearance of the image.

A communication circuit may transmit and/or receive information (e.g., data). A communication circuit may transmit and/or receive (e.g., communicate) information via a wireless link and/or a wired link. A communication circuit may communicate using wireless (e.g., radio, light, sound, vibrations) and/or wired (e.g., electrical, optical) mediums. A communication circuit may communicate using any wireless (e.g., Bluetooth, BLE, Zigbee, WAP, WiFi, NFC, IrDA, LTE, GSM, GPRS, EDGE, EV-VO, 3G, 4G, 5G) and/or wired (e.g., USB, RS-232, Firewire, Ethernet) communication protocols. Short-range wireless communication (e.g. Bluetooth, Zigbee, NFC, IrDA) may have a limited transmission range of approximately 20 cm-100 m. Long-range wireless communication (e.g. GSM, GPRS, 3G, 4G, LTE, 5G) may have a transmission ranges up to 15 km. A communication circuit may receive information from a processing circuit for transmission. A communication circuit may provide received information to a processing circuit.

A communication circuit may include a transmitter and a receiver. A communication circuit may further include a decoder and/or an encoder for encoding and decoding information in accordance with a communication protocol. A communication circuit may further include a processing circuit for coordinating the operation of the transmitter and/or receiver or for performing the functions of encoding and/or decoding. A processing circuit of a system may perform the functions that a processing circuit of a communication circuit might perform.

A communication circuit in one system (e.g., server) may communicate with a communication circuit in another system (e.g., recording device). Communications between two systems may permit the two systems to cooperate in performing a function of either system.

Image sensor 610 detects light in a field of view to capture visual images of objects that are in field of view. Images from image sensor 610 are stored in memory 640. Audio sensor 660 detects sound. Captured sound from audio sensor 660 is stored in memory 640. Image sensor 610 may capture images continuously as sequential frames of captured images. The sequential frames may be collectively stored as video data. The sequential frames may be presented serially as video data. The operation of audio sensor 660 may be coordinated with (e.g., synchronized to) the operation of image sensor 610 so that the combination of the data captured by audio sensor 660 and image sensor 610 is recorded data (e.g., content in file 300 or media files 670, 672) in the form of a movie (e.g., motion picture). The recorded data may be stored in any format, such as MPEG4 format.

In embodiments, memory 640 may include a pre-event buffer. One or more images captured by image sensor 610 may be stored in the pre-event buffer prior to receipt of an instruction to record the one or more images. The pre-event buffer may temporarily store the captured one or more images. An instruction to record may be received at an incident and, upon receipt, one or more images stored in the pre-event buffer may be recorded in memory as recorded data for the incident. An instruction to store images captured in the pre-event buffer as recorded data may be received or generated in accordance with a manual or automatic activation of a recording device such as device 600. If an instruction to record is not received within a predetermined period of time, one or more images temporarily stored in the pre-event buffer may be overwritten, deleted, or otherwise rendered unavailable for further access in a recording device. Upon recording of recorded data, one or more images stored in the pre-event buffer may be stored with one or more images captured after the recording has been initiated, such that recorded data for an incident includes one or more images captured each of prior to and after recording of recorded data has been initiated. In embodiments, the recorded data includes video data comprising one or more images captured in a pre-event buffer prior to recording of the one or more images in video data. In embodiments, one or more images captured in a pre-event buffer include one or more light-emitting screens.

Processing circuit 620 may cooperate with and/or control image sensor 610 and audio sensor 660 to capture visual and audio data for storage in memory 640. Recorded data from memory 640 may be transmitted to a server (e.g., server 160) via communication circuit 690 and its associated communication link.

A user of recording device 600 may control the operation of recording device 600, at least in part, via user interface 630. For example, a user may start, stop, and/or pause recording of video and audio data. A user may further instruct recording device 600 to transfer recorded data to a server (e.g., 160).

Processing circuit 620 may analyze data captured by image sensor 610 and/or audio sensor 660. Processing circuit 620 may generate metadata responsive to analysis. Processing circuit 620 may associate metadata to data captured by image sensor 610 and/or audio sensor 660. Processing circuit 620 may store metadata in memory 640. Metadata may be stored as part of the recorded data.

Processing circuit 620 may periodically generate, store in memory 640, and transmit via communication circuit 690 beacons that are associated with the data being captured by image sensor 610 and audio sensor 660 at the time of generation and/or transmission. The beacons may be received by other capture devices, stored in their memory, and associated with their captured data. The beacons may be used to align recorded data in time.

While FIG. 6 is discussed in the context of recording device 110, such components may also be included in other devices in the present invention, including communications device 125 and computing device 170.

Embodiments according to various aspects of the present disclosure include a redaction computing device. Device 700 is an example implementation of a redaction computing device. Device 700 may comprise a server (e.g., server 160). Device 700 may perform the functions of an evidence system. In embodiments, an evidence system receives recorded data, stores recorded data, analyzes recorded data to redact recorded data and/or generate redaction criteria, redacts recorded data, stores redaction criteria, identifies recorded data that is related to other recorded data, identifies redaction criteria that is related to recorded data, and/or stores redacted data.

Device 700 includes processing circuit 710, memory 720, detection engine 730, redaction engine 740, tracking engine 750, reidentification engine 760, redacted data store 780, data store 770, and communication circuit 790.

Data store 770 stores recorded data. System 700 may receive recorded data via communication circuit 790. Data store 770 may further store information related to recorded data. For example, related information may include a geographic position of the recording device that recorded the recorded data. Related information may include metadata. Metadata may include metadata regarding objects in the captured data identified by the recording device. Metadata may be generated by device 700. Metadata may be generated by an engine of device 700. The recorded data stored in data store 770 is referred to above, in various places, as original data. The recorded data stored in data store 770 may be unredacted or unadjusted. The recorded data stored in data store 770 may include data from a plurality of recording devices, and metadata from a plurality of recording devices. Data store 770 may receive recorded data via communication circuit 790. Data store 770 may also transmit recorded data via communication circuit 790.

Detection engine 730 detects one or more light-emitting screens in one or more received images. Engine 730 may detect locations of each of one or more light-emitting screens in the received images. The one or more received images may be included in video data. The engine 730 may not have data indicating a location of a light-emitting screen represented in the video data prior to receipt of the video data. The detection engine may implement a deep learning network to the received video data. The deep learning network may be a neural network. The detection engine may provide object detection, including real-time object detection. The object detection neural network may implement various approaches, such as YOLO, YOLO v2, or Single Shot Multibox Detector. The selected deep learning technique may automatically generalize unique features of light-emitting screens such as brightness variance between monitor and surrounding environment, appearance of text, and screen border. Such predetermined features, if detected by the engine 730, may collectively result in a screen being detected for a corresponding set of pixel values.

In embodiments, the detection engine 730 is trained on training data. The training data may include annotated training data. The training data may include one or more annotated images. The training data may include one or more images in which a light-emitting screen has been annotated. The training data may include one or more images in which a display comprising a light-emitting screen has been annotated. The training data may include one or more images in which both a bezel and a light-emitting screen of a display has been annotated. The training data may be manually annotated. An annotation of the training data may include one or more of a corner of a display, a corner of a light-emitting screen, a corner of a bezel, an edge of a display, an edge of a light-emitting screen, and an edge of a bezel. An annotation may include a type of display, such as a desktop monitor, a laptop, a tablet, an MDT, a cellular telephone, a television, and an in-car navigation screen. An annotation of the training data may include metadata associated with a boundary of one or more of a light-emitting screen, bezel, and display for each image in the training data. A deep learning technique of the engine 730 may be trained using the training data. For example, a neural network of the engine 730 may be trained (e.g., adjusted, modified, etc.) to detect a light-emitting screen by being applied to the training data. Engine 730 may learn to detect a light-emitting screen in accordance with one or more annotated light-emitting screens in each image of training data. After being trained on the training data, engine 730 may be applied to one or more new images from recorded data not included in the training data to detect zero or more light-emitting screens in each new image from the recorded data.

The input to engine 730 may include an image or a sequence of frames from recorded video data. The output from engine 730 may include metadata generated in accordance with each light-emitting screen detected in one or more images of the input image or the sequence of frames. For example, the output may include a boundary of a detected light-emitting screen. The boundary may include one or more pixel locations and one or more dimensions. In embodiments, the output from the engine may include pixel locations and bounding box dimensions. In combination, the pixel locations and dimensions may indicate pixel values associated with a light emitting screen. Pixel locations and dimensions may be provided for each received frame in which a light-emitting screen is detected. In embodiments, the output metadata may include a mask associated with a detected light-emitting screen. The mask may include one or more pixel locations and one or more dimensions. The pixel locations and dimensions for a mask may be same or different from pixel locations and dimensions generated for a boundary of a detected light-emitting screen. Engine 730 may both detect a boundary of a light-emitting screen and generate a mask for the detected light-emitting screen in an input image. Multiple sets of pixel locations may be provided for a single image, representing multiple light-emitting screens detected by engine 730 for a given image or frame. The pixel locations and dimensions may be provided to processing circuit 710 or other engines, such as redaction engine 740 for subsequent processing of video data associated with the pixel locations. In embodiments, other types of metadata may be alternately or additionally provided by engine 730 for subsequent processing by processing circuit 710, including one or more of a boundary and a mask generated for a detected light-emitting screen.

In embodiments, detection engine 730 may include one or more engines for detection of different objects in recorded data. Each engine may detect a different object in accordance with a different redaction type. For example, one engine of detection engine 730 may detect one or more faces in each image of recorded data. As another example, one engine of detection engine may detect one or more license plates in an image of recorded data. Each engine may include a neural network previously trained on training data comprising the different types of objects. Application of a given detection to recorded data may be performed in accordance with a one or more selected redaction types. In embodiments, redaction engine 730 may at least detect a type of object corresponding to a light-emitting screen, enabling the engine 730 to detect one or more light-emitting screens in each image of recorded data to which it is applied.

Detection engine 730 may transmit a pixel location, dimensions, or other metadata associated with a detected object to another component, such as memory 720, tracking engine 750, and/or reidentification engine 760. This pixel location and related information may be used by a separate component, such as engine 760 to assign a unique track ID to the object represented in the recorded data associated with the pixel location.

Reidentification engine 760 may uniquely identify or re-identify a detected light-emitting screen relative to one or more previously detected light-emitting screen. Engine 760 may perform functions, such as functions associated with blocks 549-580 in FIG. 5. The engine 760 may store track IDs for multiple objects along with features from the recorded data associated with each track ID to identify a same object in a later frame or subsequent image. The engine may store sets of track IDs along with these features in a table or other form of dataset at engine or in a store 770 and/or 780 accessible to engine 760. When an object is detected by engine 730, the engine 760 may compare the features or properties in video data or other recorded data to features identified for objects in recorded data previously processed by engine 730. If a match between features is made, the track ID from the previously identified object may be associated with the pixel location or other information generated for the object by engine 730. If a match between features of a received object and features of previously processed objects is not made, a unique track ID may be assigned to the object by engine 760. The unique track ID and features of the received object may be stored in a table accessible to engine 760 for use in identifying objects in subsequent frames. In terms of features, the identified object may be represented as a reduced set of representations of the object represented in pixel values for an object in a bounding box. For example, the features may include indications of colors, lines, shapes, relative positions, and other forms of descriptors. Alternately or additionally, the features may be a copy of the original pixel values associated with a pixel location and bounding box dimensions for an object. The matching between such features for different objects may be performed through the use of a deep learning technique, such as a deep learning network or a deep neural network. The engine 760 may implement a different network than that which is applied by other engines, such as engine 730 or engine 740. MatchNet is one example of a network that may be employed to perform matching in engine 760, though others may be used. The input to engine 760 may include video data, pixel location and bounding box dimensions, while the output may include a track ID—new or previously assigned—to be associated with the input object information.

Redaction engine 740 applies a redaction filter to pixel values in an image or one or more frames of video data. Redaction engine 740 may receive one or more instructions or indicators from processing circuit 710 to apply the redaction filter. The instructions or indicators may include an instruction to redact as well as an indication of recorded data to be redacted. The engine 740 may obtain the indicated recorded data from a data store, such as data store 770, and apply the redaction filter. The redaction filter may be a blur filter. The redaction filter may decrease differences in intensity values among groups of pixels. The pixels to which the filter may be applied may be identified by another engine, such as a tracking engine 750 or detection engine 730 or reidentification engine 760. The redaction filter may be applied to a subset of pixel values in an image or frame of recorded data. The subset of pixel values may include pixel values of an identified subset of pixels. The redaction filter may be applied in accordance with a mask. The subset of pixel values may correspond to the pixels bound by a provided bounding box, such as that which may be provided by engine 730. Alternately, fidelity of redaction may be improved by having a subset of pixels identified by a bounding box be filtered. A mask may be smaller than a bounding box. For example, engine 740 may take a rectangular filter mask or shape and modify this shape to align with pixels that correspond to a screen within a provided bounding box. The size of the mask may be increased or decreased vertically and/or horizontally in terms of pixels in each dimension. The shape of the mask may also be warped to reflect a pose of a screen to be redacted in an original image or frame. The boundaries of the mask may be angled toward each other and toward a horizon line in an image, corresponding to a rotated orientation of a screen in an image with respect to an angle of orientation of a field of view of a camera. The fitting of a mask to pixels of a screen in an image may employ a regression-based approach, though other approaches may be employed. For example, redaction engine 740 may employ a second deep learning network or deep learning neural network to identify the pixels that should be redacted by application of the redaction filter. This network may be different from that which is applied by other engines, such as engine 730. The redaction engine may also receive a second input from processing circuit 710 indicating whether redaction should be applied to one or more objects identified with pixel locations and bounding box dimensions in an image or frame received by engine 740. After an image or frame is processed by engine 740, it may be stored in redacted data store 780. A redacted image generated by engine 740 may be combined with one or more redacted and unredacted images in data store 780 as redacted recorded data.

Tracking engine 750 may receive a plurality of frames of video data. Engine 750 tracks motion of an object in subsequent frames. Engine 750 may perform functions, such as functions associated with blocks 530-546 in FIG. 5. In embodiments, if an object is present in a first frame, it is likely present in one or more subsequent frames. Identifying such objects simplifies other processing steps and may save processing power and time by permitting an assigned track ID to be reused. Tracking also promotes consistency of these applied track IDs, which may improve a quality of redaction collectively performed by system 700. This improvement is based in part on the redaction being applied on the basis of a track ID, rather than a specific pixel region. Tracking an object in a frame increases the likelihood that a track ID will be assigned, which therefore improves the likelihood that a same object will be consistently redacted in a sequence of frames. Consistency is particularly critical in the context of redaction, where a single missed frame can inadvertently allow protected information to be visible. If a single frame is missed, a technical purpose of the redaction system may be compromised. Identifying and redacting each instance of a screen across frames of a video may be critical for data security and preventing unauthorized or unpermitted access to recorded data.

Tracking engine 750 may receive a pixel location and bounding box dimensions as input, along with a first frame. The pixel location corresponds to a location of a screen in a previous frame relative to the first fame. The pixel locations associated with a previous frame may also be stored temporarily in the tracking engine 750, ready for application upon receipt of each new frame. The tracking engine 750 also receives the pixel values or frame data associated with one or more preceding or subsequent frames in time relative to the first frame. The engine estimates an optical flow based on the received pixel location and the frame data for the first frame and other frames. The optical flow may correspond to a relative motion between the first frame and the one or more preceding frames. The output of the estimation step is a pixel location in the first frame, wherein the pixel location in the first frame corresponds to the pixel location received as input, further adjusted in accordance with the optical flow. A bounding box associated with the pixel location in the first frame may also then be determined for the first frame by moving the bounding box of the previous frame in accordance with the difference in location between the input pixel location and the output pixel location. The pixel location in the first frame may be provided as an output pixel location.

In embodiments, the output pixel location may be compared with one or more pixel locations for screens detected by detection engine 730. A comparison may be made between the detected pixel location and the estimated pixel location. If the locations are within a threshold pixel distance from each other, then a match may be considered to valid and tracking engine 750 may continue processing of the estimated pixel location and associated bounding box. Otherwise, engine 750 may stop processing of the estimate pixel location and associated information.

In some embodiments, the pixel values of the pixels within the bounding box of the previous frame and the estimated bounding box for the first frame may then be compared. This comparison may be performed based on features of frame data in the bounding boxes, similar to the comparison performed by the reidentification engine 760. This comparison may also be performed based on application of a MatchNet approach, though other deep neural networks may also be employed. If a match exists, indication of the match may be provided to reidentification engine 760 so that a track ID associated with the object of the previous frame pixel location is also associated with the pixel location in the first frame. The pixel location and related information for an object may then be stored accessible to engine 750 for application to a next frame of recorded data. If the comparison step does not indicate a match, indication of the detected light-emitting screen may be provided to reidentification engine 760 so that engine 760 may perform a more extensive comparison to previously detected light-emitting screens, aside from one or more light-emitting screens that may have been detected in an immediately prior frame relative to a current frame. If no match is detected, the pixel location and bounding box dimensions estimated for the first frame may be deleted.

The tracking engine 750 may perform one or both of the location and pixel value-related comparisons discussed above. Some embodiments may perform only one such comparison for validating a tracked object among subsequent frames. The above discussion largely focuses on tracking a single object associated with a single set of pixel location and bounding box dimensions information. However, a tracking engine may retain and track sets of such information for zero or multiple objects associated with a previous frame depending on visual information of the previous frame according to various aspects of the present disclosure.

Processing circuit 710 may control and/or coordinate the operation of redaction engine 740, detection engine 730, tracking engine 750, reidentification engine 760, redacted data store 780, data store 770, memory 720, and communication circuit 790. Processing circuit 710 may perform some or all of the functions of engines 730, 740, 750, and 760. Processing circuit 710 may transmit one or more of recorded data, redacted recorded data, generated metadata, and other information via communication circuit 790. Processing circuit 710 may receive information comprising recorded data, one or more instructions to detect light-emitting screens, and one or more instructions to redact data via communication circuit 790 according to various aspects of the present disclosure.

Memory 720 may store programs executed by processing circuit 710. The stored programs stored in memory 720, when executed, may perform some or all of the functions of system 700 or any portion thereof. Memory 720 may perform some or all of the functions of redacted data store 780 and data store 770. In embodiments, memory 720 includes at least one memory configured to store one or more of recorded data, redacted recorded data, executable instructions for detecting one or more light-emitting screens, and executable instructions for redacting one or more detected light-emitting screens.

The term "engine" as used herein refers to, in general, circuitry, logic embodied in hardware and/or software instructions executable by a processing circuit. Circuitry includes any circuit and/or electrical/electronic subsystem for performing a function. Logic embedded in hardware includes any circuitry that performs a predetermined operation or predetermined sequence of operations. Examples of logic embedded in hardware include standard logic gates, application specific integrated circuits ("ASICs"), field-programmable gate arrays ("FPGAs"), microcell arrays, programmable logic arrays ("PLAs"), programmable array logic ("PALs"), complex programmable logic devices ("CPLDs"), erasable programmable logic devices ("EPLDs"), and programmable logic controllers ("PLCs"). Software instructions for execution by a processing circuit may be written in any programming language, including but not limited to C, C++, COBOL, JAVA™, Python, PUP, Perl, HTML, CSS, JavaScript, VBScript, ASPX, HDL, and/or Microsoft .NET™ programming languages such as C#. The software for an engine may be compiled into an executable program or written in an interpreted programming language for execution by a suitable interpreter or virtual machine executed by a processing circuit. Engines may be callable (e.g., executable, controllable) from other engines or from themselves.

Generally, the engines described herein can be merged with other engines, other applications, or may be divided into sub-engines. Engines that are implemented as software for execution by a processing circuit may be stored in any type of computer-readable medium. An engine may be stored on and executed by one or more general purpose computers, thus creating a special purpose computer configured to perform the functions of (e.g., provide by) the engine.

A system may include one or more processing circuits configured to perform the functions of the illustrated engines, though the processing circuit that performs the functions of an engine may not be expressly shown.

Figure 7:
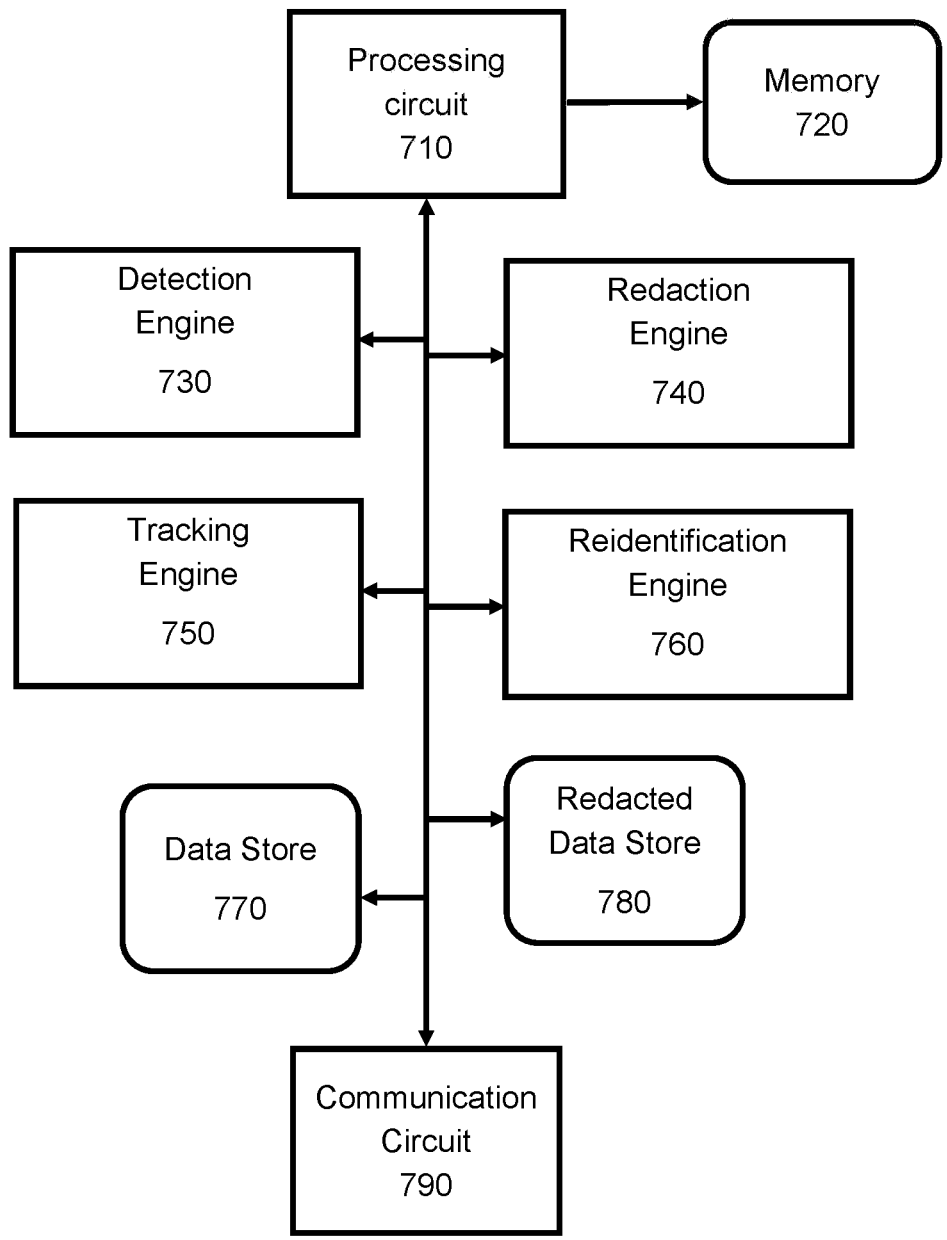
FIG. 7 is a block diagram of an example implementation of a redaction computing device according to various aspects of the present disclosure.

As understood by one of ordinary skill in the art, a "data store" as described herein may be any suitable device configured to store data for access by a processing circuit. A data store receives data. A data store retains (e.g., stores) data. A data store retrieves data. A data store provides data for use by a system, a processing circuit, and/or an engine. A data store may organize data for storage. A data store may organize data as a database for storage and/or retrieval. The operations of organizing data for storage in or retrieval from a database of a data store may be performed by a data store. A data store may include a repository for persistently storing and managing collections of data. A data store may store files that are not organized in a database. Data in a data store may be stored in a computer-readable medium. A data store may include any computer-readable medium such as flash memory, random access memory (RAM), or hard disk memory. A data store may be integrated with another system. Separate data stores described herein may be combined into a single data store, and/or a single data store described herein may be separated into multiple data stores. For example, data store 770 is integrated with system 700 as shown in FIG. 7. A data store may also be directly accessible via a network, such as data store 150 accessible via network 140 in FIG. 1.

Redaction data store 780 and data store 770 perform the functions of a data store. A data store may be implemented using any computer-readable medium (e.g., memory). An engine (e.g., redaction engine 740 or detection engine 730) or processing circuit 710 may access a data store locally (e.g., via a data bus), over a network, and/or as a cloud-based service. For example, redacted data store 780 may be provided at a network location, such as data store 150, rather than integrated within system 700.

Figure 8:
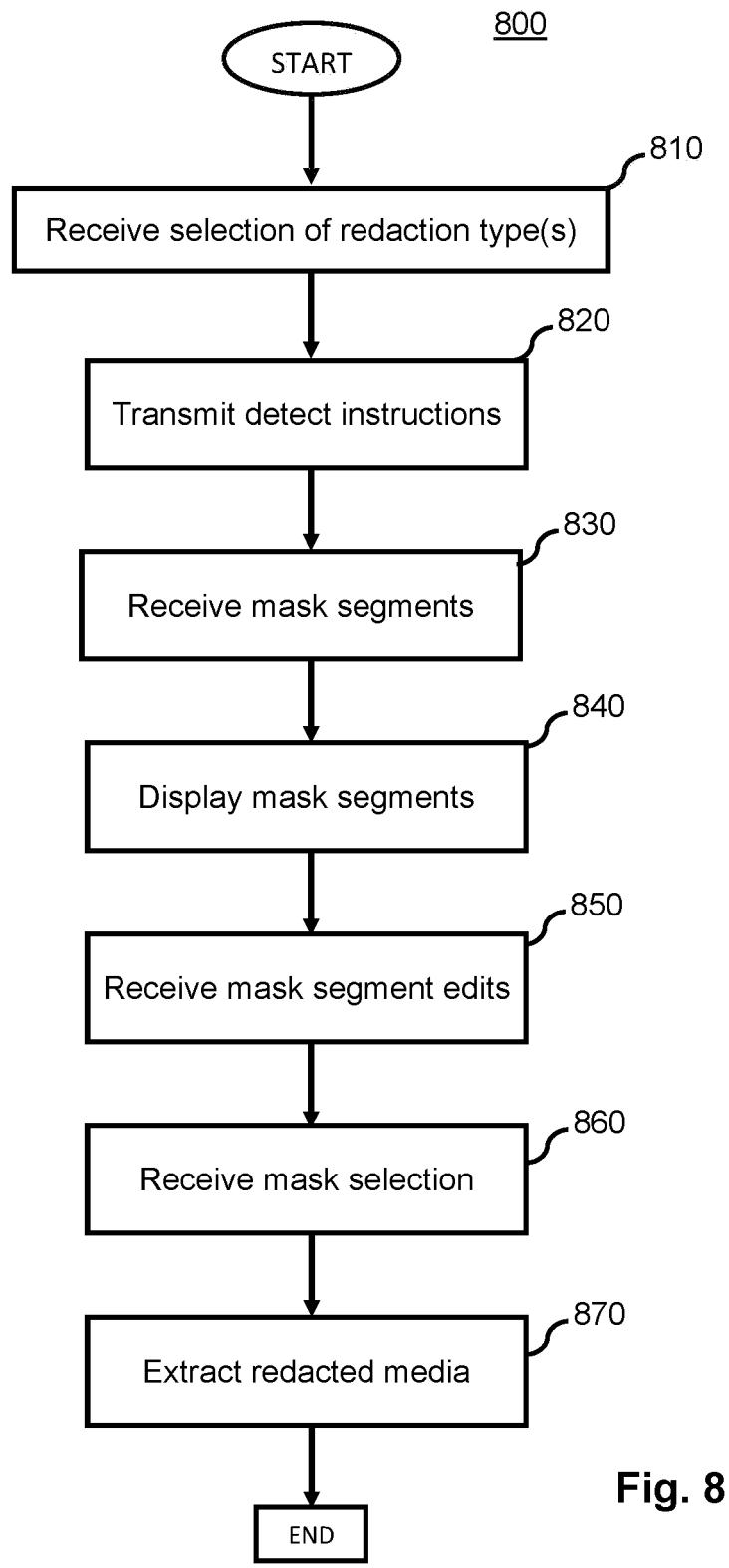
FIG. 8 is a diagram of an example method for redacting data at a computing device according to various aspects of the present disclosure.

Embodiments according to various aspects of the present disclosure include computer implemented methods for redacting data. FIG. 8 is a diagram of an example method for redacting data at a computing device according to various aspects of the present disclosure.

Method 800 may be performed by a computing device. The computing device may include a computing device for redacting light-emitting screens in one or more images recorded at an incident, the device comprising at least one memory configured to store instructions for redaction and at least one processing circuit configured to execute the instructions, wherein execution of the instructions by the at least one processing circuit causes the redaction computing device to transmit an instruction to detect one or more light-emitting screens in one or more images in video data, receive a mask associated with each image of the one or more images in the video data in which at least one of the one more light-emitting screens is detected, and transmit an instruction to extract redacted video data from the video data, wherein the redacted video data includes one or more images redacted in accordance with a respective, received mask. The computing device may be computing device 170, for example. The computing device may be a client device, configured to communication with a remote redaction computing device over a network. One or more steps may be performed using a data store. The data store may include data store 150 or an internal data store for the device. The method may be performed by a processing circuit of the computing device. The processing circuit may be configured to execute instructions. Execution of the instructions may cause the computing device to perform functions. The functions may include one or more blocks discussed herein. The steps may include those shown at blocks in FIG. 8. The instructions may be stored on a computer-readable, non-transitory medium as discussed elsewhere herein.

As will be apparent from the following description, method 800 provides various benefits. For example, method 800 speeds up a process of redacting recorded data by checking video data for video screens (e.g., light-emitting screens), faces, and license plates, and automatically adding mask segments to those objects. After one or more mask segments are added, the one or more mask segments may be displayed for review and edited as needed. Method 800 cuts down an amount of time necessary to execute redaction of objects. In accordance with method 800, a number of instructions to perform redaction may be reduced to the benefit of one or more computing devices on which method 800 is executed.

At start, method 800 begins by receiving 810 a selection of one or more redaction types. A redaction type may correspond to a different type of object to be detected in a media file. In embodiments, redaction types include light-emitting screens, license plates, and faces. In embodiments, at least a redaction type of light-emitting screens may be received 810.

A redaction type may be selected via input received by the computing device. For example, a selection of one or more buttons on a user interface element may be received. Each button may be a start button associated with a respective redaction type. The selection of a button may cause the computing device to transmit an instruction to detect comprising an indication of the selected redaction type. A processing circuit of the computing device may provide a plurality of redaction types for selection. For example, the selections may be provided via display of the computing device. A selection received for each redaction type may cause an instruction to detect associated with the redaction type to be transmitted by the computing device, wherein the instruction to detect may include an indication of the respective redaction type. A single instruction to detect may include a respective indication for each of a plurality of redaction types for which selections is received. Alternately, multiple separate instructions to detect may be transmitted, each instruction comprising an indication of a respective, different redaction type for which a selection has been received by the computing device. In embodiments, a selection may be received via one or more user interface devices of the computing device. The user interface devices may include one or more of a keyboard, mouse, and touchscreen. Receiving a selection may also include displaying one or more user interface elements on a display of the computing device. Multiple redaction types may be selected.

In embodiments, receiving a selection of a redaction type may include receiving a selection of recorded data for redaction. The selection of the recorded data may be received before the redaction type is received. The selection may be received after the redaction type is received. The selection may include a selection of a file name or other unique identifier of recorded data. The selection may be made among a list of recorded data available for redaction in a data store. A selected recorded data may be displayed on a user interface device prior to receipt of the selection of the redaction type.

In embodiments, receiving a selection of a redaction type may include receiving an instruction to detect. The instruction to detect may include an instruction to detect the object associated with the selected redaction type. For example, the instruction to detect may include an instruction to detect a light emitting screen. In embodiments, determining an image in which a light-emitting screen is detected includes receiving an instruction to detect the light-emitting screen.

Upon receiving selection 810, an instruction may be transmitted 820 to a redaction computing device. The instruction may include one or more instructions to detect one or more objects in accordance with the received 810 selections. The instructions may include an indication of a selected redaction type. Transmitting the instruction to detect may comprise transmitting an indication of a selected redaction type of light-emitting screens. The selected redaction type of light-emitting screens may be a first redaction type among a plurality of redaction types. The plurality of redaction types may include one or more of a redaction type associated with faces and redaction type associated with license plates. These redaction types may be redaction types available for selection, along with the redaction type of light-emitting screens. In embodiments, the transmitted instruction may include an indication of any one of the plurality of redaction types for which a selection is received. The transmitted instruction may include an indication of each of the plurality of redaction types for which a selection is received.

In embodiments, the transmitted instruction may include an indication of selected recorded data to which the instructed detection should be applied. For example, the instruction may include a file name of a media file. Alternately, the recorded data to which the instruction to detect should be applied may be previously and separately identified to the redaction computing device, such that the redaction computing device is configured to associate the instruction to redact with the previously identified recorded data upon receipt of the instruction to detect.

Upon receipt of the instruction, the redaction computing device will then begin processing (e.g., scanning, reviewing, etc.) each frame in a recorded data or media file to detect one or more objects corresponding to the selected redaction types. For example, the redaction computing device may begin scanning for objects corresponding to one or more of light-emitting screen, faces, and license plates in accordance with the transmitted instructions.

While the redaction computing device is scanning, the computing device may exit the user interface element by which the selections were received 810. For example, a window or program may be closed. The computing device may even be restarted powered off altogether. A redaction computing device will continue scanning and processing a media file in a background, independent of a state of the computing device. Processing of selected recorded data may include generation of metadata associated with detected objects, wherein at least a subset of generated metadata may be transmitted to the computing device from the redaction computing device. In embodiments, the computing device may transmit a second instruction associated with the recorded data, separate from a previous instruction to detect, wherein the second instruction causes the redaction computing device to provide previously generated metadata associated with processing of the recorded data prior to transmission of the second instruction. Depending on availability of the computing device to receive metadata generated from the scanning, the redaction computing device may store the generated metadata until the second instruction is received. In other embodiments, the redaction computing device may transmit metadata upon generation and the computing device may be configured to receive the metadata, wherein the metadata may be transmitted in one or more of in real time, a frame-by-frame basis, and/or periodically upon generation of metadata for each of a predetermined number of frames.

At block 830, one or more mask segments may be received. Each mask segment may include one or more masks associated with a detected object. A mask segment of the one or more mask segments may include a plurality of frames in which a same object is detected. The segments may be received upon on after a user interface element (e.g., program or browser) associated with method 800 at the computing device is reopened. Reopening a user interface element or reselecting the recorded data at the user interface element may cause a second instruction to be transmitted to a redaction computing device to cause the one or more mask segments to be transmitted or otherwise provided by the redaction computing device. Each mask segment may be associated with a different object. Each mask segment may be associated with a redaction type previously received 810. In embodiments, determining an image in which a light-emitting screen is detected includes receiving metadata associated with the image. In embodiments, determining a mask associated a detected light-emitting screen for display includes receiving the mask.

In embodiments, mask segments may be received in real-time upon generation by a redaction computing device. The mask segments may include a mask for each detected object in the media file. One or more masks in each mask segment may each include an indication of a particular image of recorded data to which the mask is related and with which the mask is to be displayed. Each mask segment may be associated with a unique track ID. The mask segments may include a sequence of masks corresponding to a tracked object over time in a sequence of frames. Each frame in the sequence may have a corresponding mask for a mask segment. The sequence of frames may be a continuous set of frames in video data of a media file. Multiple mask segments may be received, each mask segment for a different tracked object in the media file. Multiple mask segments may be received for different objects associated with a same redaction type. For example, a mask segment may be received for each of the masks 390,395 illustrated in FIG. 3. A first mask segment may comprise or correspond to a first mask 390 for MDT 370 and a second mask segment may comprise or correspond to a second mask 395 for device 380. Each mask segment in this example corresponds to a light-emitting screen redaction type. A mask segment for license plate may include one or more masks positioned to cover a detected license plate. A mask segment for a light-emitting screen may include one or more masks positioned to cover a detected screen. A mask segment for a face may include a mask to cover a detected face.

In embodiments, receiving a mask segment may include receiving metadata comprising a mask and an identifier. The mask and the identifier may be each associated with a same detected light-emitting screen. Upon receipt, the mask may be added to or otherwise associated with a mask segment at the computing device when the identifier of the mask matches an identifier of the one or more masks of the mask segment. Upon receipt, a new mask segment may be created for a mask for which the received identifier does not match an identifier of a mask previously received by the computing device. A computing device may receive the metadata and perform one or more functions on the received metadata, including comparing an identifier in the metadata with one or more identifiers previously received. In other embodiments, the identifier may include an index among a plurality of identifiers, wherein a receiving computing device processes the mask associated with the identifier relative to one or more mask segments in accordance with the index. For example, the computing device may add a received mask to a mask segment in accordance with the index and a number of the mask segment among a plurality of indexes.

At block 840, mask segments may be displayed. The one or more received mask segments may be displayed on a display of the computing device. The one or more received mask segments may be displayed on a user interface element on a display of the computing device. Receiving a mask segment may include receiving and displaying a mask of the mask segment on an associated image. Displaying a mask segment may include determining one or images to which each mask in a mask segment is associated, receiving the one or more associated images, and displaying the one or more associated images with corresponding mask segments. A mask of each mask segment may be overlaid on a subset of pixels in an image associated with a detected object. Displaying the mask of a mask segment may include overlaying the mask on an associated image in which an object such as a light-emitting screen has been detected. For example, mask 390 is overlaid on a subset of pixels associated with a detected light-emitting screen 375 in FIG. 3.

The mask segment may be displayed on an image such that content of one or more pixels of the image remain discernable and visually identifiable upon display. Displaying a mask may include displaying the mask around a subset of pixels associated with the detected light-emitting screen. In embodiments, each of the mask segment may be associated with a same detected light-emitting screen in a sequence of images in video data.

In embodiments, mask segments may be displayed in a segment timeline. The segment timeline may be displayed parallel to a seek bar for the recorded data in which an object associated with the segment is detected. The mask segments may be displayed in real-time. The mask segment may be updated on a frame-by-frame basis in which generated metadata for each frame of recorded data may be received and added to the display of metadata previously received for the mask segment. A mask segment may increase in size as additional masks are received in real time. A mask segment may increase along a segment timeline. Each mask segment may be displayed in a separate segment timeline. A mask of a mask segment may be displayed on a corresponding frame of the media file. For example, frame 225 of the example of FIG. 2 may be displayed with a mask 390 imposed or overlaid thereon as shown for frame 325 in the example of FIG. 3.

In embodiments, other generated metadata may also be received 830 and displayed 840, along with a mask segment. For example, a boundary of a detected object may be received and displayed. As another example, an indication of a type of a light-emitting screen detected in a frame may be received. The type of a light-emitting screen may include a screen of one of a desktop monitor, a laptop, a tablet, an MDT, a cellular telephone, a television, and an in-car navigation screen. The type of screen may be subsequently displayed in order to provide additional context for a detected object. In embodiments, a default selection may also be received and displayed. The default selection may correspond to a selection of user interface element, such as one or more masks or mask segments. A default selection may indicate a selection to be made and transmitted to a redaction computing device absent an additional related selection. For example, one or more mask segments associated with a type of light-emitting screen may be selected by default for redaction, indicating that the type of light-emitting screen should be redacted absent additional selection or other input being received at a computing device.

In embodiments, displaying and receiving a mask segment may occur concurrently. A first mask associated with a mask segment may be displayed at a same time in which a second mask associated with the mask segment may be received. The mask segment for the first and second masks may be a same or different mask segment. Receiving a mask may include displaying a first mask associated with a first image of one or more images in recorded data prior to receiving a second redaction mask associated with a second image of the one or more images. Receiving a mask may include displaying a first mask associated with a first image of one or more images in recorded data concurrently receiving a second redaction mask associated with a second image of the one or more images. A displayed mask segment may be displayed upon being received, including when being received on a frame-by-frame basis or ongoing basis. A user interface element may be configured to receive and display a mask segment as each mask of the mask segment is received, including each mask received for the mask segment after initial display of the mask segment.

After generated metadata is received at a computing device for one or more detected objects, various inputs may be subsequently received. The inputs may be received via a user interface of one or more computing devices on which method 800 is executed. The inputs may include one or more selections. The one or more selections may each be associated with a detected object of the one or more detected objects. For example, a selection may be associated with a detected light-emitting screen, enabling each image in which the light-emitting screen is detected to be redacted in accordance with the selection. The input may include a selection comprising a mask edit, enabling each image with a mask or mask segment associated with the mask edit to be subsequently redacted in accordance with the mask edit. The input may include a selection of a mask segment associated with a same light emitting screen across one or more of the one or more images. The various inputs may enable a user to review, adjust, and confirm a redaction should be applied to each detected object in recorded data. In other embodiments, one or more redactions may be automatically applied by a redaction computing device, without or independent of one or more inputs received after an initial instruction related to redaction has been transmitted to the redaction computing device.

At block 850, mask segment edits may be received. Editing a mask segment may include editing one or more masks in a mask segment associated with one or more frames. Editing a mask segment may include editing an individual mask in a mask segment. Editing a mask may include one or more of increasing or decreasing a dimension of a received mask segment. Edits to a mask segment may be received at the computing device via one or more user interface devices. The edits may be used to adjust a display of a mask in a displayed frame of media data. Editing the mask segments may also include the computing device transmitting the edits to a redaction computing device from which an edited mask was first received. Editing a mask in a mask segment may include one or more of adjusting a start and end times for the mask in the media file; changing a blur level of the mask; deleting the mask; moving the mask; and changing a size of the mask. One or more such edits may be applied to each mask in an overall mask segment for an edited mask. In embodiments, determining a mask associated a detected light-emitting screen for display may include receiving a mask edit for the mask.

At block 860, selection of one or more mask segments may be received. Receiving a selection may include receiving a selection via a user interface device of a computing device. A selection may include a selection or a deselection of a mask segment. Receiving a selection may include receiving a selection of a mask in a frame and associating the selection with a mask segment in which the mask is included. For example, a checkbox adjacent a displayed mask may be selected. The association may include associating the selection with a track ID of the mask segment. Receiving a selection may include receiving a direct selection of a mask segment. For example, a mask segment may be directly selected on a display of the computing device. The direct selection may be received at a segment timeline displayed on a user interface device of the computing device. The selection may be directly associated with the track ID of the mask segment based on this segment. Receiving a selection may include transmitting the selection to a redaction computing device. Receiving the selection may include transmitting a track ID to a redaction computing device. Receiving the selection may include transmitting an indication of whether a selection includes a selection of a mask segment or a deselection of a mask segment.

A selection of a mask segment may be indicated visually on a display. The selection may be indicated on a segment timeline associated with a mask segment. For example, an unselected mask segment may be displayed as an open, unfilled rectangle. A selected mask segment may include a same rectangle filled in with one or more colors, patterns, or other indicia. The rectangles may be displayed in the segment timeline.

A mask segment may be unselected by default. For example, a mask segment associated with a face may be unselected by default, requiring further input to confirm and cause a redaction to be applied to the detected face in the media file. Other redaction types may be selected by default. For example, a mask segment associated with each detected license plate may be initially appear selected upon display of the mask segment. Additional selection may be required to prevent redaction of a given license plate.

At block 870, redacted media may be extracted. The redacted media may include redacted media data. The redacted media may include redacted recorded data. The redacted media may include redacted video data. The redacted media may include one or more images redacted in accordance with a received mask. The received mask may include a respective mask associated with each of the one or more images.

In embodiments, extracting redacted media may include receiving selection to redact. The selection may include a selection of an user interface element on a display of the computing device. For example, the selection may be received via a button, toggle or other selectable user interface element on a user interface of the display. An instruction to redact may be generated in response to receipt of the selection to redact. One or more instructions to apply a redaction filter to one or more images in recorded data may be generated in accordance with the received selection to redact.

Extracting redacted media may include transmitting one or more instructions to apply a redaction filter to the media file in accordance with one or more of the received mask segments, mask segment edits, and received mask segment selection. The transmitted instructions may include one or more selections to be received by the redaction computing device for redacting the recorded data in accordance with the one or more selections, wherein the selections may include one or more of a selection associated with each detected light-emitting screen, a mask edit, a default selection provided by the redaction computing device, and a selection of a mask segment associated with a same light emitting screen across one or more of the one or more images. The selections may be received via a user interface of a computing device on which method 800 is executed. The selections may include a default selection received from a remote computing device. In embodiments, the transmission may include receiving a selection in accordance with one or more of blocks 850-860.

In embodiments, a redaction computing device may extract redacted media in accordance with instructions to extract redacted media data 870 provided by a computing device. Extracting media data may include redacting recorded data in accordance with one or more generated masks and one or more received instructions for redaction. For example, masks associated with selected mask segments may cause corresponding pixels to be redacted. Masks associated with unselected mask segments may preclude corresponding pixels from being redacted. In embodiments, extracted media may include In embodiments, extracting redacted media may include receiving a redacted media file from a redaction computing device. Extracting redacted media may include receiving a hyperlink though which a redacted media file may be streamed, downloaded, or otherwise viewed. For example, a redaction computing device may provide one or more redacted images or frames for display and extracting redacted media may include displaying the provided one or more redacted images on a display of a computing device. After block 870, method 800 ends.

While method 800 may have an order of blocks as shown in FIG. 8, it will be appreciated that functions associated with blocks may be performed by a processing circuit in a different order and/or in parallel in embodiments according to various aspects of the present disclosure. For example, a selection of a mask segment may be received 860 prior to receipt of a selection of a mask edit.

Embodiments according to various aspects of the present disclosure may include a computer-implemented method of image redaction, comprising receiving an image, the image comprising a plurality of pixel values; detecting a light-emitting screen in the image; redacting one or more of the pixels based on the detected light-emitting screen. The method may be implemented on a redaction computing device, which includes a memory storing at least one image, along with a processing circuit, wherein the processing circuit is configured to perform one or more steps disclosed herein on the at least one image.

Detection of a light-emitting screen may comprise detecting one or more predetermined light-emitting screen features in the image. One of the detected features may be brightness variance within a block of pixels. One of the detected features may be text detected within a block of pixels. One of the detected features may include a screen border. Multiple, separate light-emitting screens may be detected in a same image. The detected light-emitting screen may be a display screen of a vehicular mobile data terminal or a display screen of a mobile computing device. Such screens include screens of smartphones, tablet computers, laptops, and vehicular mobile data terminals. A sequence of images can be received as input to methods according to the invention. This sequence may correspond to frames of video data, where each frame includes a plurality of pixel values. Embodiments according to various aspects of the present disclosure may include detecting a light-emitting screen in each frame and identifying whether a same light-emitting screen is detected in two or more of the frames. Such detection may be based on tracking a location of a detected light-emitting screen across frames. Such detection may also involve a comparison between pixel values associated with a screen detected in two different frames. When a same screen is detected across frames, a unique identifier may be assigned to the same light emitting screen. This unique identifier may include a unique and/or random numerical value. The same screen can be detected in two non-sequential frames in the received sequence of frames of video data. The non-sequential frames may include interposed or chronologically intermediate frames in which the same light-emitting screen is not detected. A plurality of light-emitting screens may be detected in the frames and multiple same screens may be identified as present in two or more of the frames. Multiple same screens may be detected in multiple frames. An orientation of a same screen represented in two different frames may be different, but still be detected by embodiments of the present invention. A user input or other instruction may be received associated with one or more of the identified screens. The instruction may be associated with a unique identifier. The unique identifier may in turn be associated with pixel values and regions of pixels values across multiple frames of received video data. Selective redaction of a same screen may be applied based on the input. Redaction of pixel values may include redacting a diamond-shaped set of pixels and corresponding pixel values in the image.

Embodiments according to various aspects of the present disclosure may also include a redaction computing device and one or more of a local computing device on which original or redacted recorded data is displayed and a recording device from which recorded data may be generated and transmitted to the redaction computing device. The redaction computing device and the other device may be included in a redaction system for redacting recorded data.

Embodiments according to various aspects of the present disclosure may also include a local computing device on which redaction of one or more redaction types are selected and instructions for extracting redacted video may be received. The location computing device may be a client device, configured to transmit and receive information from a remote computing device over a network. The remote computing device may be a redaction computing device. In other embodiments, the local computing device may comprise a redaction computing device.

The foregoing description discusses embodiments, which may be changed or modified without departing from the scope of the present disclosure as defined in the examples. Examples listed in parentheses may be used in the alternative or in any practical combination. As used in the specification and examples, the words 'comprising', 'comprises', 'including', 'includes', 'having', and 'has' introduce an open-ended statement of component structures and/or functions. In the specification and examples, the words 'a' and 'an' are used as indefinite articles meaning 'one or more'. When a descriptive phrase includes a series of nouns and/or adjectives, each successive word is intended to modify the entire combination of words preceding it. For example, a black dog house is intended to mean a house for a black dog. In the examples, the term "provided" is used to definitively identify an object that not an example element but an object that performs the function of a workpiece. For example, in the example "an apparatus for aiming a provided barrel, the apparatus comprising: a housing, the barrel positioned in the housing", the barrel is not an example element of the apparatus, but an object that cooperates with the "housing" of the "apparatus" by being positioned in the "housing".

The location indicators "herein", "hereunder", "above", "below", or other word that refer to a location, whether specific or general, in the specification shall be construed to refer to any location in the specification whether the location is before or after the location indicator.

What is claimed is:

1. A system for redacting light-emitting screens in an image recorded at an incident, the system comprising:
   a redaction computing device comprising a detection engine, the redaction computing device configured to perform first operations comprising:
      detecting, via the detection engine, a light-emitting screen of a display recorded in the image;
      transmitting an indication of the detected light-emitting screen over a network; and extracting redacted media comprising a redacted image in which pixels in the image associated with the detected light-emitting screen are redacted; and a client computing device configured to perform second operations comprising:
receiving the indication of the detected light-emitting screen from the redaction computing device over the network;
in accordance with the indication, displaying a redaction mask associated with the detected light-emitting screen; and
transmitting an instruction associated with the displayed redaction mask, wherein:
the extracting comprises extracting the redacted media in accordance with the transmitted instruction; and
the detection engine is trained using training data comprising one or more images in which a boundary between a light-emitting screen and a non-light-emitting bezel of a display included in each of the one or more images has been annotated.

2. The system of claim 1, wherein detecting the light-emitting screen in each image of the one or more images comprises identifying the pixels in the image associated with the detected light-emitting screen.

3. The system of claim 2, wherein transmitting the indication comprises concurrently:
providing the indication of the detected light-emitting screen to the client computing device over the network; and
detecting, via the detection engine, the light-emitting screen of the display in a second image, different from the image for which the indication is concurrently transmitted.

4. The system of claim 2, wherein:
detecting the light-emitting screen comprises generating the redaction mask associated with the identified pixels in the image; and
the indication comprises the redaction mask.

5. The system of claim 4, wherein an area of the redaction mask for the image is greater than an area of the identified pixels in the image.

6. The system of claim 1, wherein the detected light-emitting screen is a screen of a mobile data terminal mounted in a vehicle.

7. The system of claim 1, wherein the instruction comprises a selection associated with the detected light-emitting screen and extracting the redacted media comprises redacting the image in accordance with the selection.

8. The system of claim 7, wherein the selection includes a mask edit and redacting each image includes redacting each image in accordance with the mask edit.

9. The system of claim 7, wherein the indication comprises a default selection from the redaction computing device and the selection is generated in accordance with the default selection.

10. The system of claim 1, further comprising a body-worn camera configured to:
capture the image at the incident;
recording the image in video data; and
upload the video data to the redaction computing device.

11. A computer-implemented method for redacting video data recorded at an incident, the method comprising:
receiving an image of the video data, the image comprising a plurality of pixel values;
detecting a light-emitting screen of a display captured in the received image, the detected light-emitting screen surrounded on one or more sides via one or more non-light-emitting bezels captured in the received image;
generating a mask associated with the detected light-emitting screen; and
redacting a subset of the pixel values associated with the detected light-emitting screen and the mask, wherein a shape of the mask corresponds to a shape of the detected light-emitting screen, and wherein detecting the light-emitting screen in the received image comprises concurrently:
providing an indication of the subset of the pixel values for display; and
identifying another subset of the pixel values associated with the light-emitting screen in a second image of the video data, wherein the received image is different from the second image.

12. The method of claim 11, further comprising:
capturing the image inside a vehicle.

13. The method of claim 12, wherein the capturing comprises capturing the image by a body worn camera inside the vehicle.

14. The method of claim 13, wherein the display is a display of one of a mobile data terminal mounted in the vehicle or a mobile communications device.

15. The method of claim 11, wherein an area of the subset of the pixel values is greater than an area of pixels in the image representing the detected light-emitting screen.

16. A non-transitory computer-readable medium comprising computer-executable instructions for redacting light-emitting screens that, when executed by a processing circuit of a redaction computing device, cause the processing circuit to at least perform operations comprising:
detecting a light-emitting screen of a display captured in an image of video data, wherein the light-emitting screen is a portion of the display that outputs information visually;
generating a mask associated with the light-emitting screen; and
extracting redacted media, wherein:
the light-emitting screen is captured in the image adjacent a non-light-emitting bezel of the display;
detecting the light-emitting screen comprises applying the video data to a neural network previously trained on separate images each comprising one or more annotated light-emitting screens each surrounded on one or more sides via one or more respective non-light-emitting bezels;
detecting the light-emitting screen comprises generating metadata indicative of the light-emitting screen, wherein the metadata includes one or more of a boundary, pixel location, or dimension that indicates a set of pixel values of the image that represent the light-emitting screen; and
extracting the redacted media includes redacting the image in accordance with the mask to provide a redacted image.

17. The computer-readable medium of claim 16, wherein a shape of the mask corresponds to a shape of the light-emitting screen.

18. The computer-readable medium of claim 16, wherein the operations further comprise receiving the video data from a body-worn camera worn configured to be worn by a law enforcement officer; and
the display comprises a display of one of a mobile data terminal mounted in a vehicle or a mobile communications device.

19. The computer-readable medium of claim 16, wherein an area of the mask is greater than an area of pixels representing the light-emitting screen in the image.

20. The computer-readable medium of claim 16, wherein each image of the separate images comprises an annotation of one or more of a corner of an annotated light-emitting screen of the one or more annotated light-emitting screens, a corner of a bezel of the one or more respective non-light-emitting bezels, an edge of the annotated light-emitting screen of the one or more annotated light-emitting screens, or an edge of the bezel of the one or more respective non-light-emitting bezels.

\* \* \* \* \*